(12) United States Patent
Uruta

(10) Patent No.: US 7,343,114 B2
(45) Date of Patent: Mar. 11, 2008

(54) IMAGE FORMING APPARATUS AND VERIFICATION CONTROL METHOD THEREOF

(75) Inventor: Hiroya Uruta, Shibuya (JP)

(73) Assignee: Ricoh Company, Ltd., Tokyo (JP)

( * ) Notice: Subject to any disclaimer, the term of this patent is extended or adjusted under 35 U.S.C. 154(b) by 322 days.

(21) Appl. No.: 11/136,467

(22) Filed: May 25, 2005

(65) Prior Publication Data

US 2005/0265744 A1 Dec. 1, 2005

(30) Foreign Application Priority Data

May 27, 2004 (JP) .............................. 2004-157343

(51) Int. Cl.
*G03G 15/00* (2006.01)
(52) U.S. Cl. .............................. 399/80; 399/8; 399/81
(58) Field of Classification Search .................. 399/80, 399/79, 81, 8
See application file for complete search history.

(56) References Cited

U.S. PATENT DOCUMENTS 7,181,150 B2 * 2/2007 Miyazaki ..................... 399/80

2006/0062588 A1 * 3/2006 Saka et al. ..................... 399/80
2006/0067722 A1 * 3/2006 Toyoda et al. ................ 399/80

FOREIGN PATENT DOCUMENTS

| JP | 2001-328328 | 11/2001 |
| JP | 2003-058343 | 2/2003 |
| JP | 2003-226047 | 8/2003 |

* cited by examiner

*Primary Examiner*—Sophia S. Chen
(74) *Attorney, Agent, or Firm*—Oblon, Spivak, McClelland, Maier & Neustadt, P.C.

(57) ABSTRACT

An image forming apparatus including a communication interface configured to couple to a network, and a printing unit configured to process print data received via the communication interface. Also provided is a registration unit configured to register a plurality of user information for a plurality of users, each of the plurality of user information including hierarchy information corresponding to one of the plurality of users. The image forming apparatus further includes a managing unit configured to determine if operations of the image forming apparatus requested by the plurality of users are executable based on the corresponding hierarchy information. The managing unit is also configured to manage a verification process for the plurality of users based on the corresponding hierarchy information.

35 Claims, 24 Drawing Sheets

FIG. 3
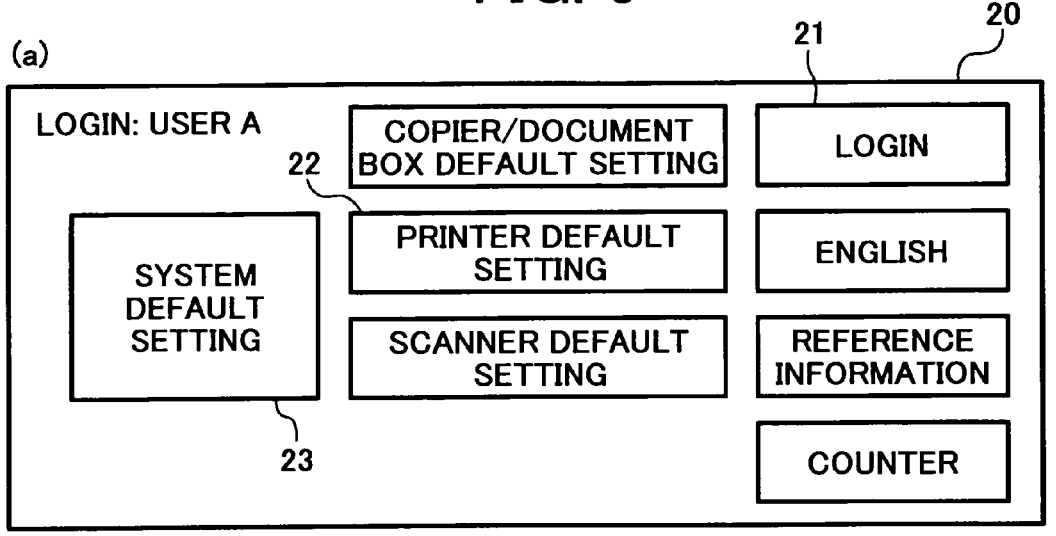
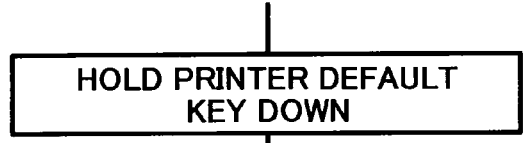
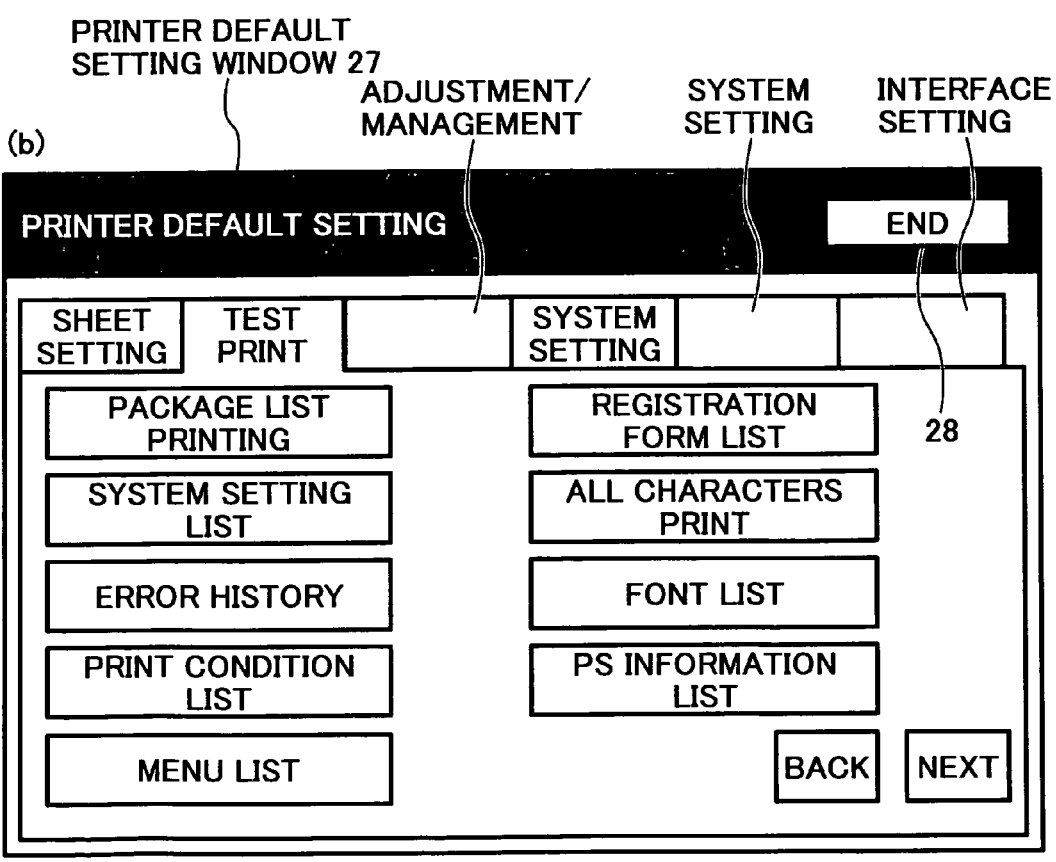

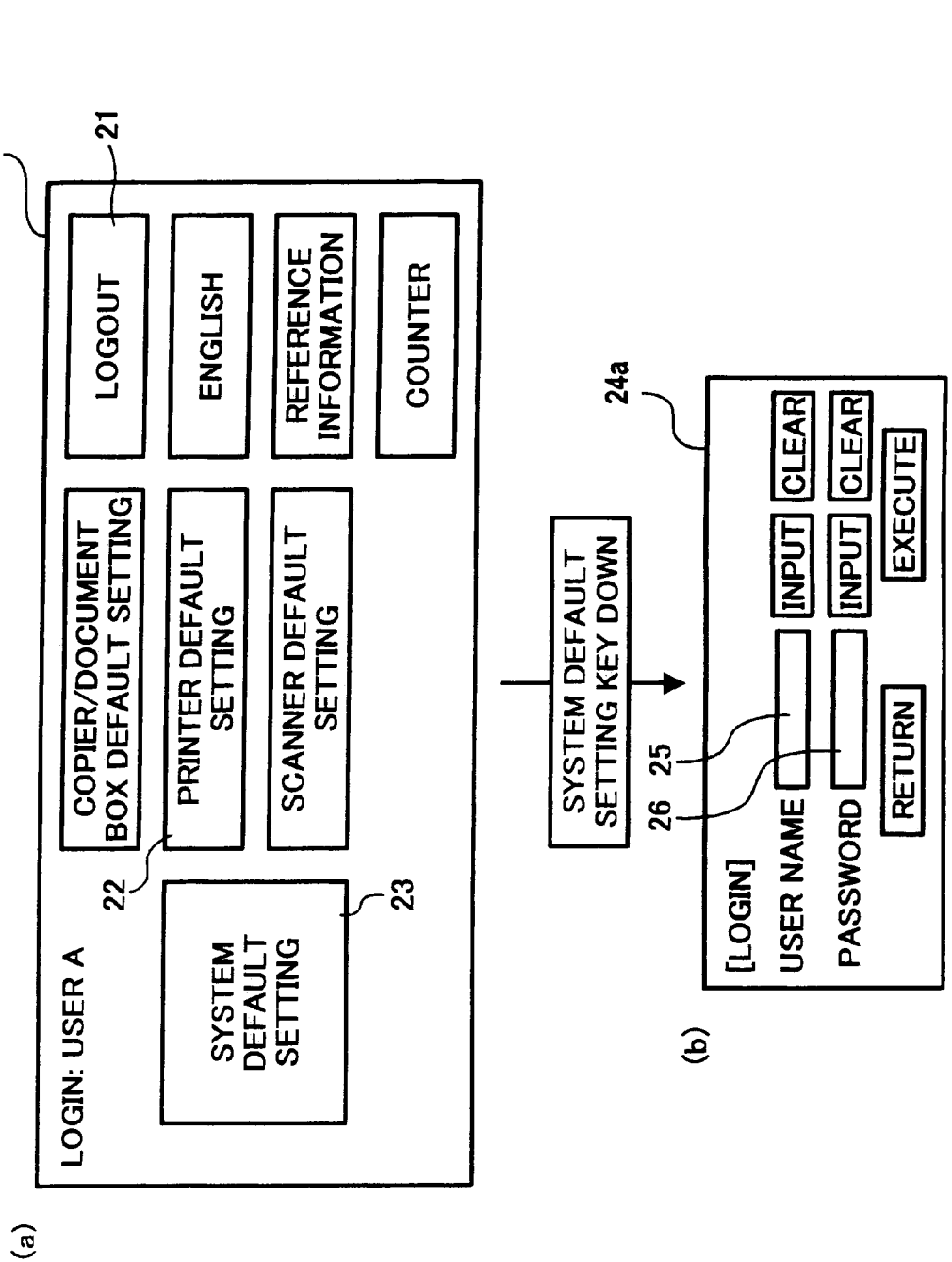

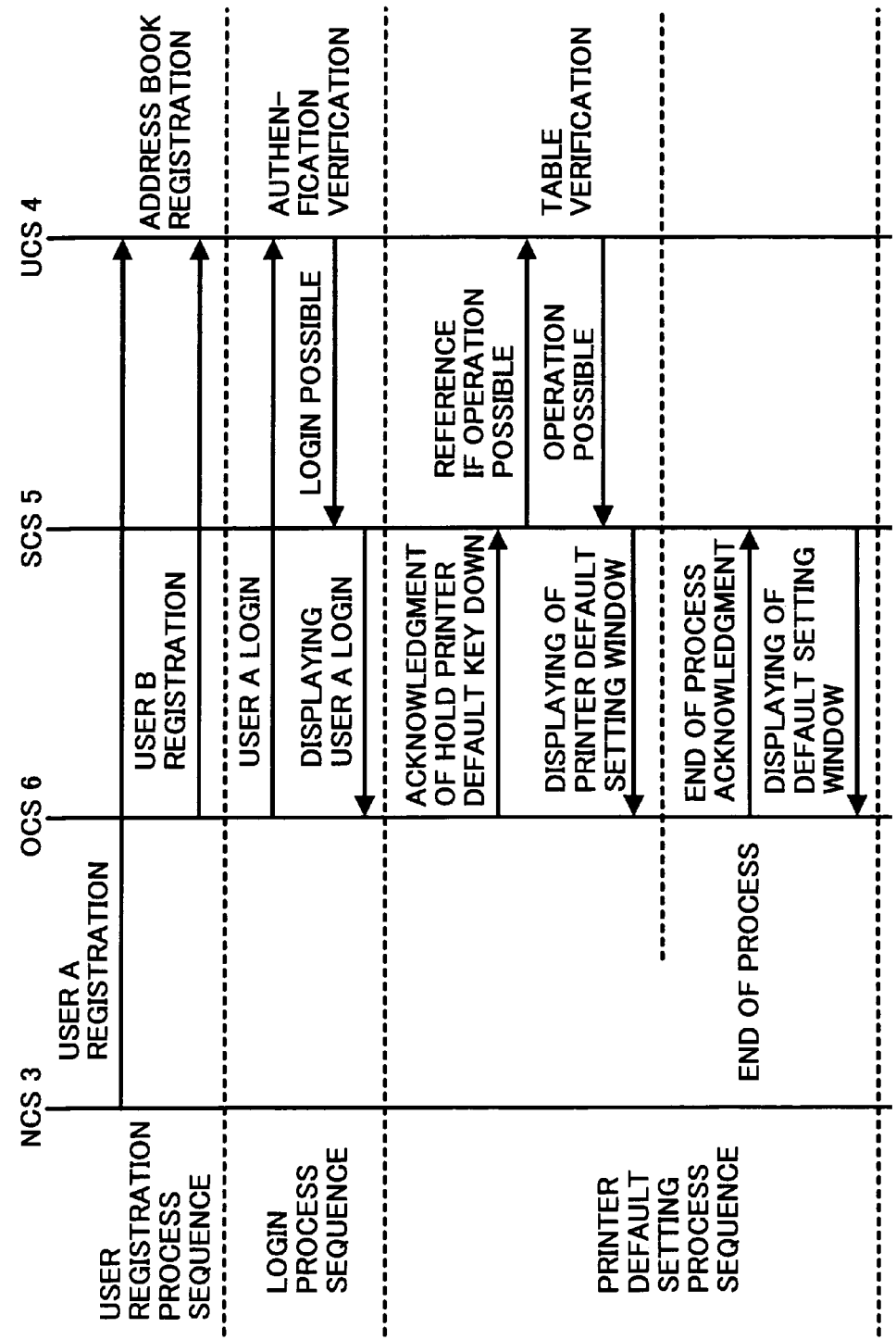

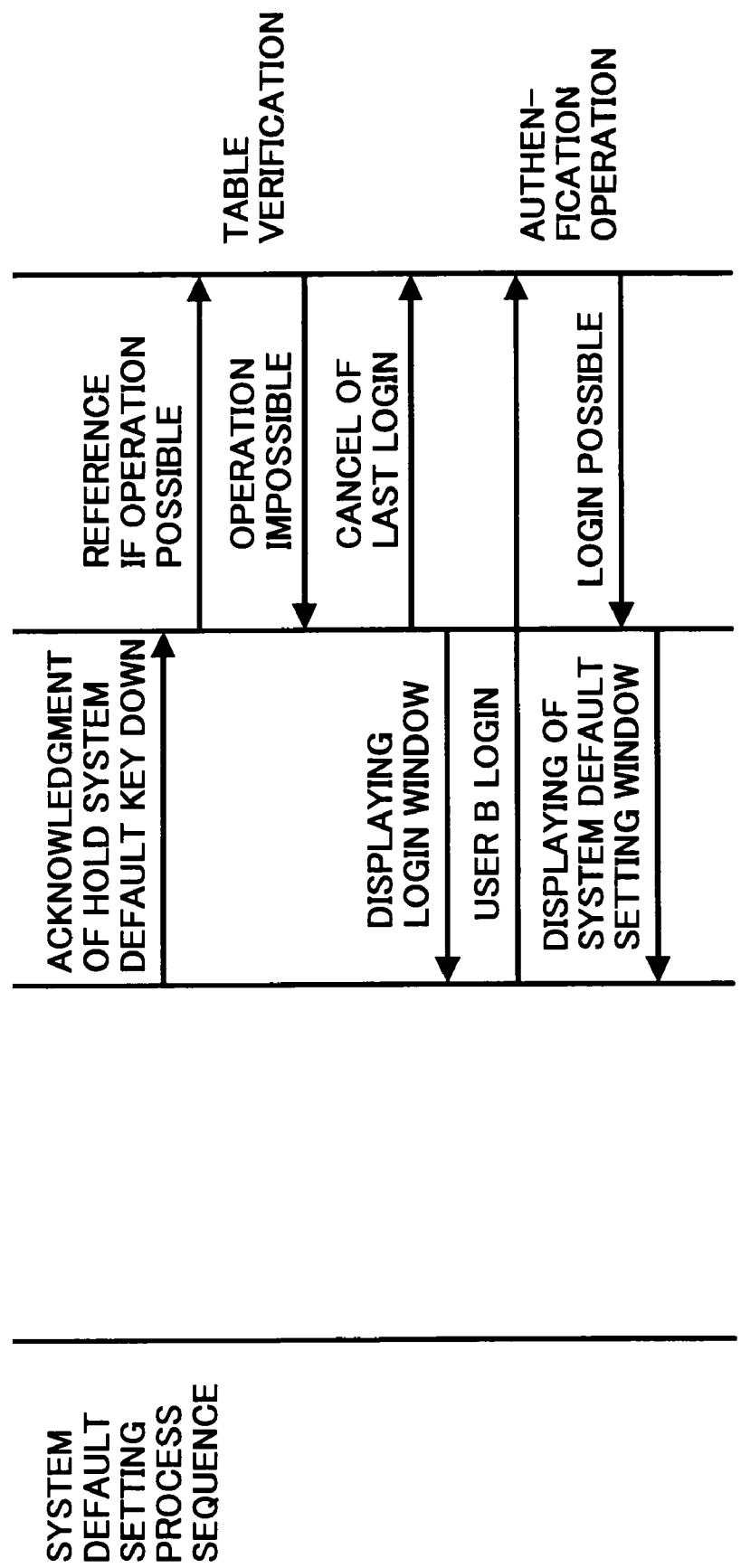

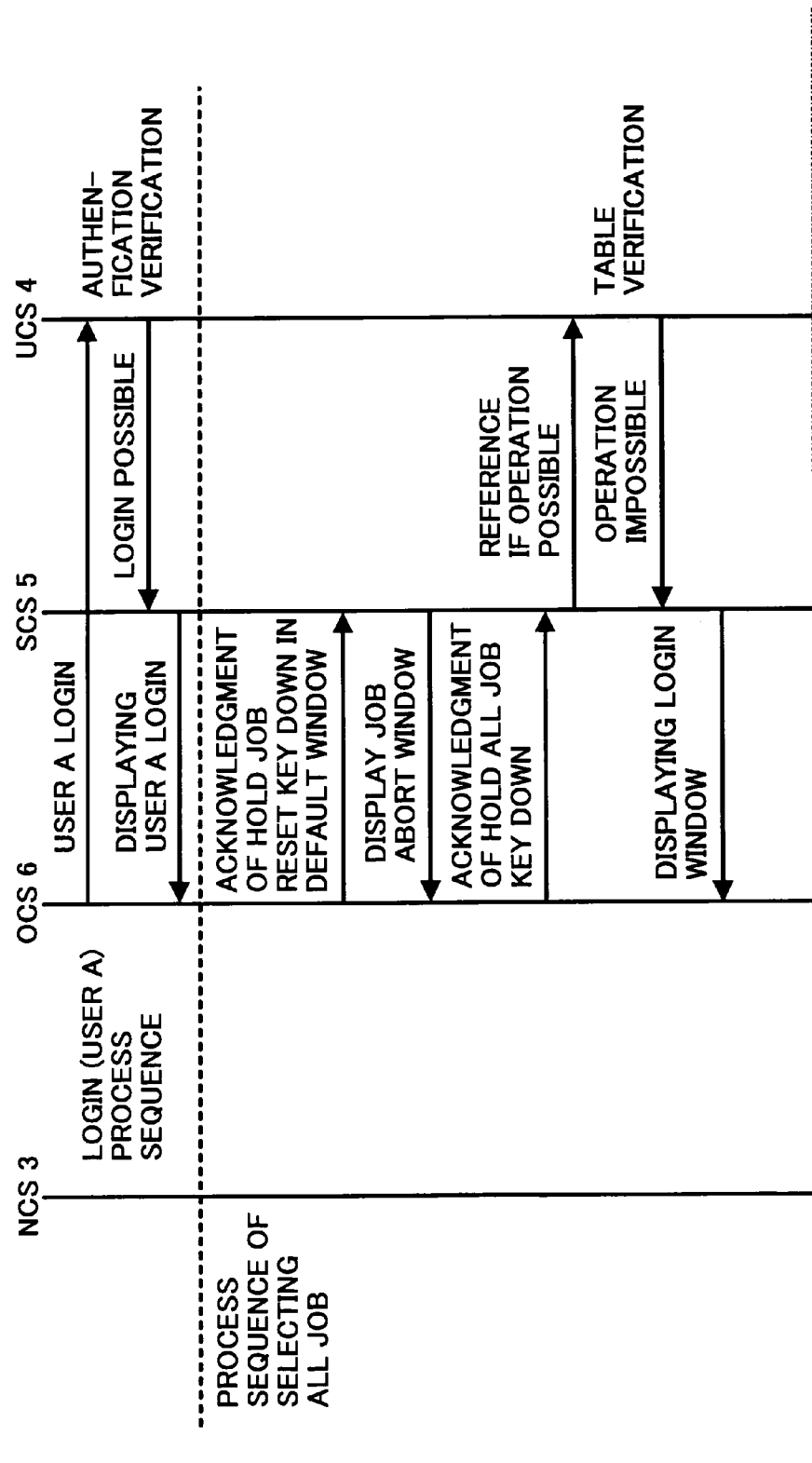

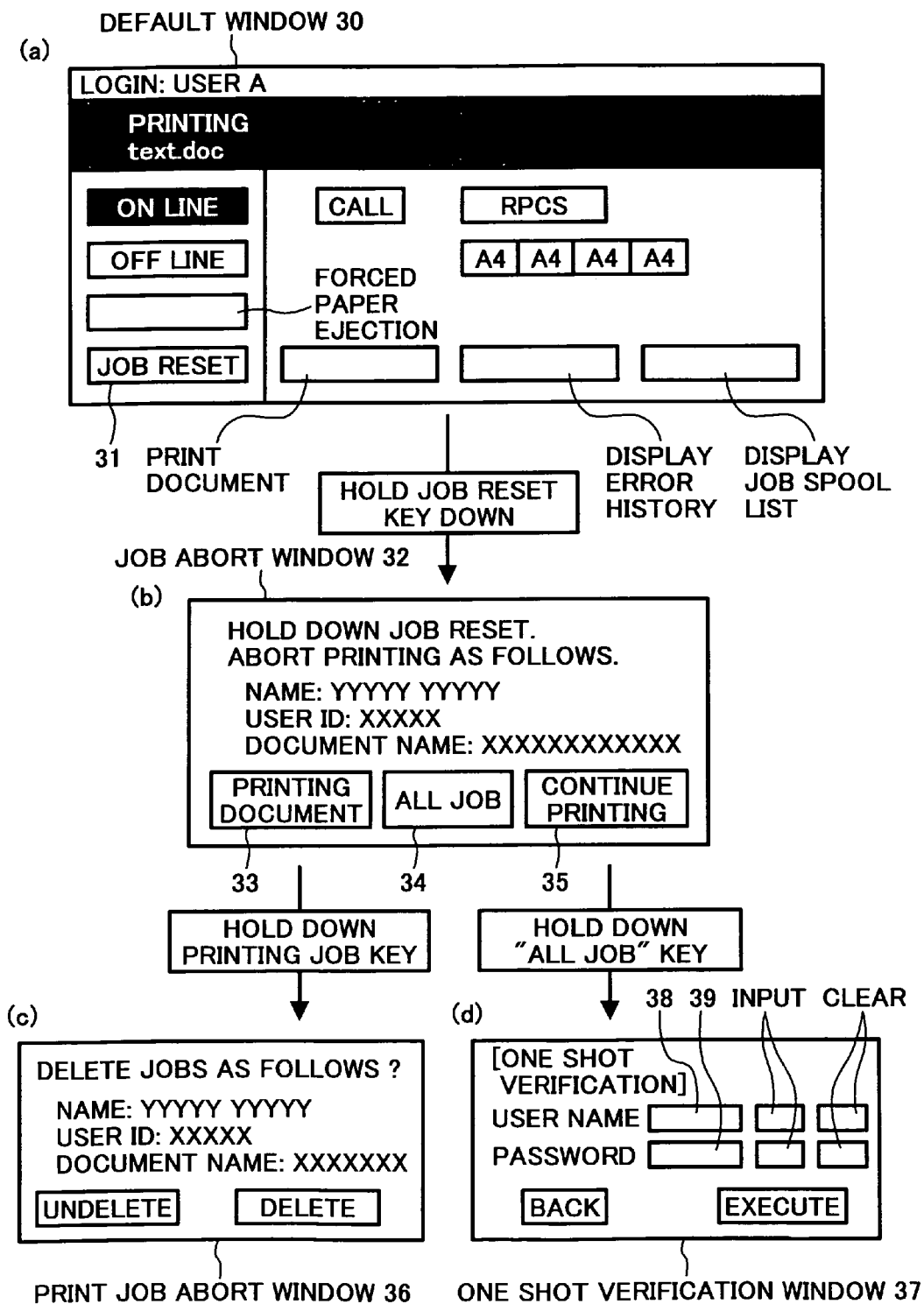

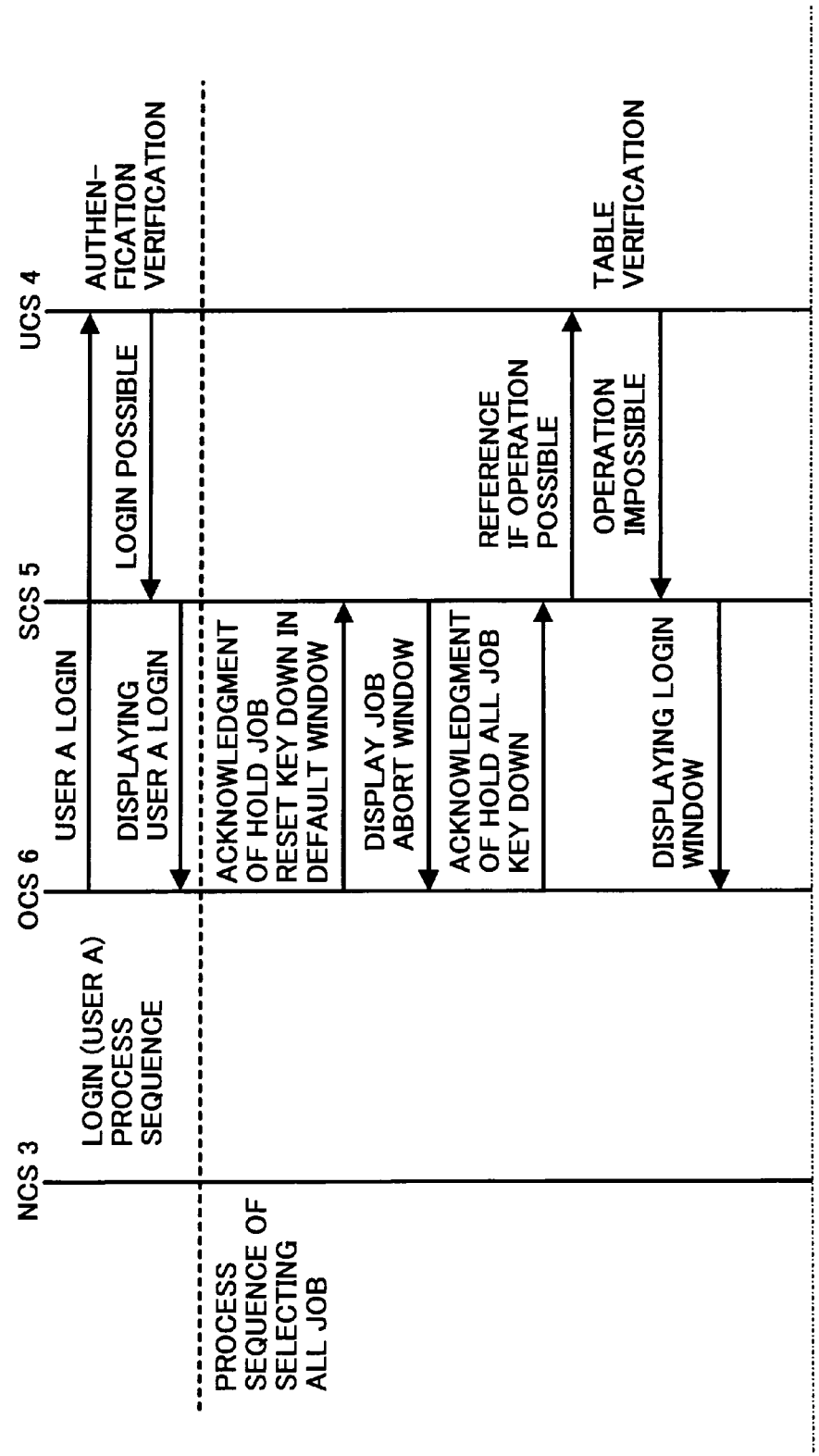

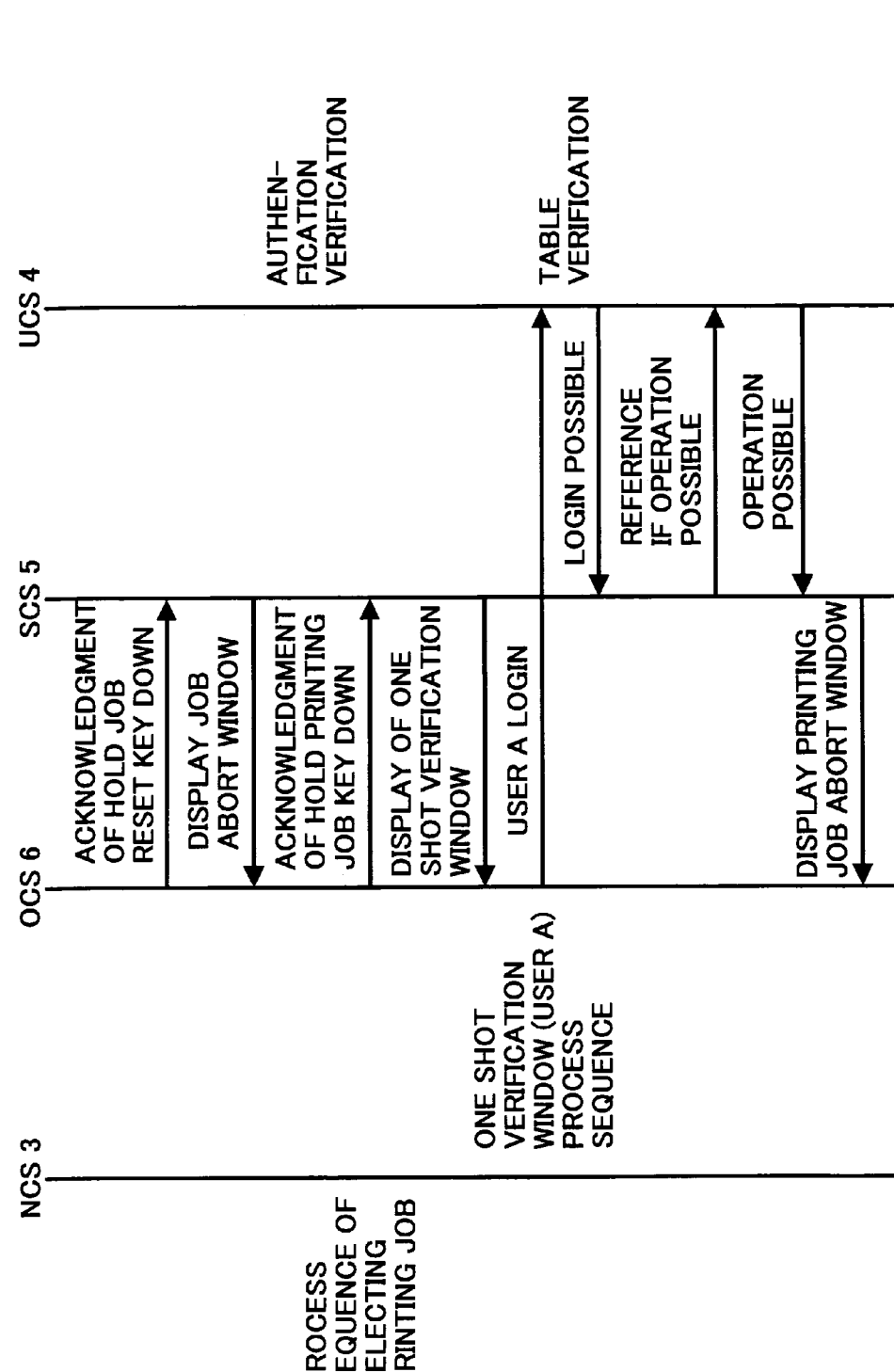

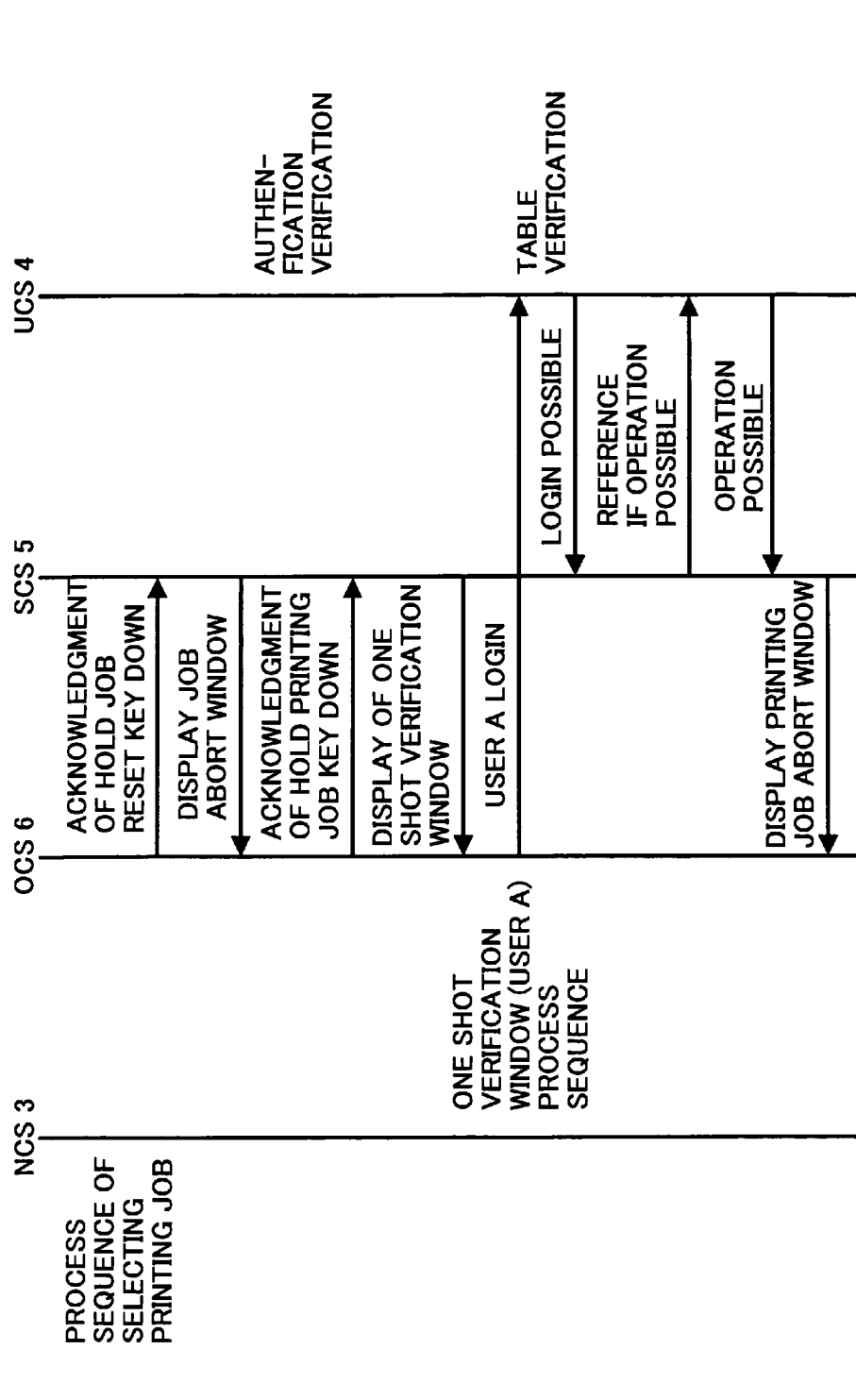

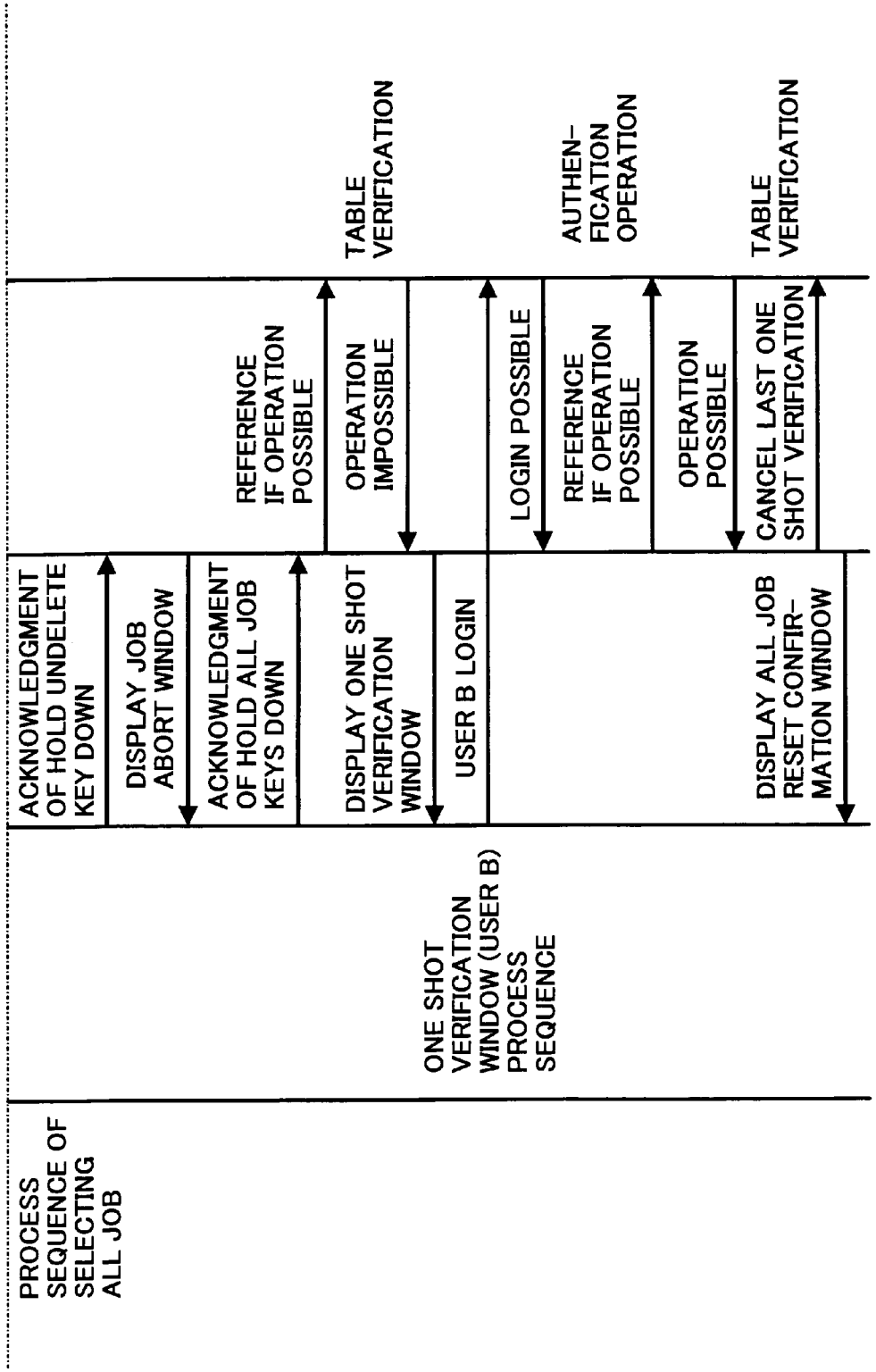

E···EXECUTABLE
N···NOT EXECUTABLE

| CATEGORY | NAME OF KEY | FREE USER | GENERAL USER | MANAGER | | | NETWORK MANAGER | DOCUMENT MANAGER |
|---|---|---|---|---|---|---|---|---|
| DEFAULT SETTING | SYSTEM SETTING | N | N | E | E | E | E | E |
| | DEFAULT SETTING OF COPY/DOCUMENT BOX | N | E | E | E | E | E | E |
| | DEFAULT SETTING OF PRINTER | N | E | E | E | E | E | E |
| | DEFAULT SETTING OF SCANNER | N | E | E | E | E | E | E |
| | LOGIN | E | E | E | E | E | E | E |
| | SWITCHING LANGUAGE | N | E | E | E | E | E | E |
| | REFERENCE INFORMATION | N | E | E | E | E | E | E |
| | COUNTER | … | … | … | … | … | … | … |

FIG. 18B

| CATEGORY | NAME OF KEY | FREE USER | GENERAL USER | MANAGER | | | NETWORK MANAGER | DOCUMENT MANAGER |
|---|---|---|---|---|---|---|---|---|
| DEFAULT SETTING OF SYSTEM | | | | | | | | |
| BASIC SETTING | BUZZER SOUND | N | N | N | N | E | E | E |
| | ACKNOWLEDGMENT SOUND | N | N | N | N | E | E | E |
| | PRIORITY FUNCTION | N | N | N | N | N | E | E |
| | SHIFT TIME | N | N | N | E | N | N | E |
| | COUNTER DISPLAY | N | N | N | N | E | N | E |
| | INTERRUPT | N | N | E | N | N | E | E |
| | PERMISSION OF JOB RESET | N | N | N | N | N | N | E |
| | ... | ... | ... | ... | ... | ... | ... | ... |
| DEFAULT SETTING OF PRINTER | PACKAGED LIST PRINT | N | E | N | N | N | E | E |
| | SYSTEM SETTING LIST | N | E | N | N | N | E | E |
| ... | ... | ... | ... | ... | ... | ... | ... | ... |

E···EXECUTABLE  N···NOT EXECUTABLE

IMAGE FORMING APPARATUS AND VERIFICATION CONTROL METHOD THEREOF

BACKGROUND OF THE INVENTION

1. Field of the Invention

The present invention generally relates to electronic image forming and, more particularly, to controlling user verification and authorization processes of an image forming apparatus.

2. Description of the Background Art

In network systems, the exchange of data among connected devices has become relatively simple, due to technological advances that continue to be increasingly efficient and affordable. Of course, among the transmitted data is information of a confidential nature, and such protected data is sent to and received by various types of electronic devices, including image forming devices such as office printers. Because image forming devices often have the capability of temporarily storing inputted information to be printed, including confidential data, it is necessary to prevent unauthorized users from gaining control of the devices to access the protected information. For example, the ability to input an instruction to an image forming device may be limited to prevent an information leak.

In present systems, security settings for network printing devices are controlled by a managing user, who possesses an administrative authority higher than other users. Specifically, users other than the manager are not authorized to adjust the settings or operations of image forming devices related to the access of stored data.

Japanese Publication No. 2003-226047 (JP '047), the entire contents of which are hereby incorporated herein by reference, describes a network system including an image forming apparatus that is shared by multiple users. The image forming apparatus is provided with a confidential printing function that prevents unauthorized users from accessing confidential information to be printed. Specifically, JP '047 describes a feature in which confidential print data is protected even after a cancellation of a current print job is requested. In particular, if the cancellation of a print request for confidential print data is requested, the stored print data will only be deleted in the image forming apparatus if a password corresponding to the print requester is entered.

Further, Japanese Publication No. 2003-058343 (JP '343), the entire contents of which are hereby incorporated herein by reference, describes an image forming device that receives and processes a request from a client device through a network. The image forming device manages the use of the device based on user identification information attached to print job requests, for example, by counting a quantity of use and a use time associated with the user identification information. In the system described in JP '343, even if a print job is sent via the network to the image forming device by a registered user, but without attached user identification information, a server of the network is capable of generating user identification information and of forwarding the print job to the image forming device with the user identification information.

Moreover, Japanese Publication No. 2001-0328328 (JP '328), the entire contents of which are hereby incorporated herein by reference, describes a method for handling a paper jam in a printer. Specifically, in the event of a paper jam, the printer described in JP '328 allows a user to modify a sheet size and a paper discharging direction for a specific print job as a back-up proceeding. In this way, the stored print data, which may include confidential information, is not deleted when a paper jam occurs, but rather can be used to create a printed document of a size and discharge direction different from the originally-requested size and discharge direction.

However, each of the image forming apparatuses described in these publications operates pursuant to a security policy determined by a manager in situations concerning the confidentiality of data and the management of various kinds of information. The management of global settings for a particular device, such as a security policy, cannot be performed by a general, non-manager user, who has lower administrative privileges than the manager. Because these systems depend on a manager to control various basic settings and processing operations, many functions associated with image forming devices become complicated, as general users are not able to adjust such functions on their own.

For example, JP '047 describes a security method relating to the cancellation of a print job for a confidential document, and relating to user certification in a document unit. However, JP '047 does not provide for deletion or resetting of all processing, including printing execution, in a device. Furthermore, JP '343 describes executing a verification setting to attach to a print job that occurs when an image forming device accepts the print job. However, while verification processing is performed for every print job in the system described in JP '343, verification related to an operation of the image forming device or to management of the image forming device is not described. Furthermore, JP '328 describes the storing of confidential data in a device even when a paper jam occurs. However, in JP '328, managing a document output and save operations in an appropriate manner is not described. Also, JP '343 and JP '328 describe verification processes that are based on print job data. In these processes, it is necessary to request verification information from a user for each separate operation that the user requests.

SUMMARY OF THE INVENTION

An object of the present invention is to provide a verification process based on user information, instead of on print job data. In this way, the confidentiality of data in an image forming apparatus is maintained while reducing the burden of needing to demand an appropriate verification for every processing operation requested by users. This novel capability is performed by verifying a level of authority, for a general user or for a manager user, in the image forming apparatus itself.

In accordance with one aspect of the present invention, an image forming apparatus is provided, including a communication interface configured to couple to a network, and a printing unit configured to process print data received via the communication interface. Also provided is a registration unit configured to register a plurality of user information for a plurality of users, each of the plurality of user information including hierarchy information corresponding to one of the plurality of users. The image forming apparatus further includes a managing unit configured to determine if operations of the image forming apparatus requested by the plurality of users are executable based on the corresponding hierarchy information. The managing unit is also configured to manage a verification process for the plurality of users based on the corresponding hierarchy information.

In accordance with another aspect of the present invention, a method for controlling an image forming apparatus is provided. The method includes receiving print data via a communication interface of the image forming apparatus and generating a printed document based on the print data. Also provided is the step of registering a plurality of user information for a plurality of users, each of the plurality of user information including hierarchy information corresponding to one of the plurality of users. The method further includes determining if operations of the image forming apparatus requested by the plurality of users are executable based on the corresponding hierarchy information, and managing a verification process of the image forming apparatus for the plurality of users based on the corresponding hierarchy information.

In accordance with a further aspect of the present invention, an image forming apparatus is provided, including a communication interface configured to couple to a network, and a printing unit configured to process print data received via the communication interface. Also provided is a registration unit configured to register a plurality of user information for a plurality of users, each of the plurality of user information including hierarchy information corresponding to one of the plurality of users. The image forming apparatus further includes means for managing the image forming apparatus. The means for managing includes means for determining if operations of the image forming apparatus requested by the plurality of users are executable based on the corresponding hierarchy information, and means for managing a verification process for the plurality of users based on the corresponding hierarchy information.

These and other objects, features, and advantages of the present invention will become apparent upon consideration of the following description of the preferred embodiments of the present invention, taken in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

FIG. 3 is a two-part diagram illustrating (a) a representation of the operating panel display and (b) a default setting display after a "printer default setting" key is pushed down;

FIG. 4 is a two-part diagram illustrating (a) a representation of the operation panel display and (b) a default setting display after a "system default setting" key is pushed down;

FIGS. 5A and 5B is a sequence chart illustrating processes performed during operation of the image forming apparatus of FIG. 1 in accordance with a first embodiment of the present invention;

FIG. 12 is a four-part diagram illustrating (a) a default display during a job operation in accordance with a fourth embodiment of the present invention, (b) a display corresponding to a job reset request, (c) a display corresponding to a job reset request during a print job, and (d) a display corresponding to the selection of an "all job" reset request;

FIG. 16 includes FIGS. 16A and 16B, which form a sequence chart illustrating another example of an operating procedure in accordance with the fifth embodiment of the present invention;

FIG. 18 includes FIGS. 18A and 18B, which form a user authority table in accordance with the present invention.

DETAILED DESCRIPTION OF THE PREFERRED EMBODIMENTS

Figure 1:
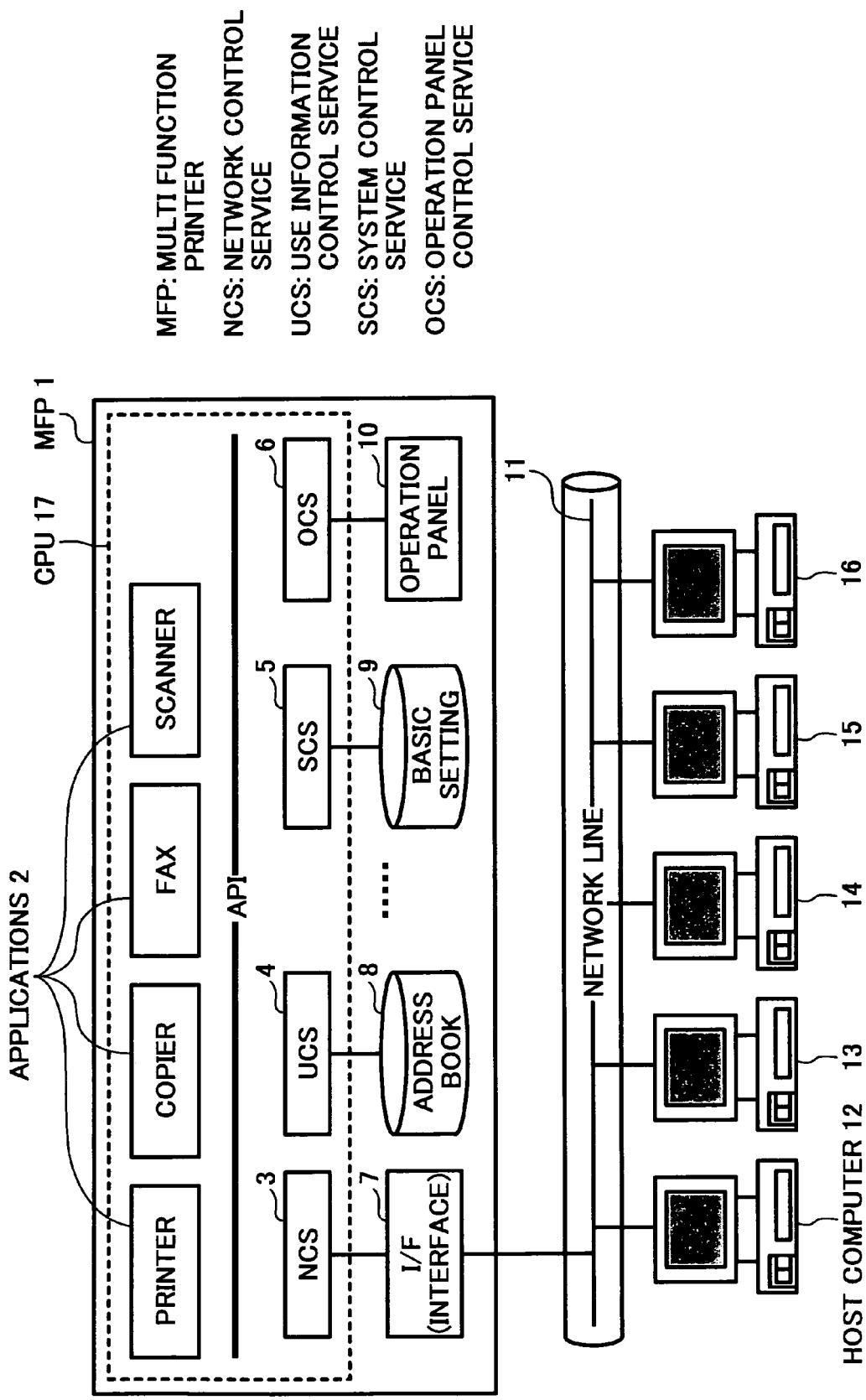
FIG. 1 is a schematic diagram illustrating a network system including an image forming apparatus in accordance the present invention.

Referring now to the drawings, wherein like reference numerals designate identical or corresponding parts throughout the several views, non-limiting embodiments of the present invention are described. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

In FIG. 1, an image forming apparatus 1 is shown as a multi-function printer (MFP), which includes the capabilities of a desktop printer, a copier, a fax machine, and a scanner. Alternatively, the image forming apparatus 1 can be arranged to perform as only some of the above-listed devices or can perform other additional electronic functions useful in office settings. Further, the range of applications and software modules shown in FIG. 1 can be greater or less than that which is represented in the MFP 1.

The MFP 1 includes a hardware interface 7 configured to receive and send data, and an operation panel 10 for allowing a user to input commands into the MFP 1. The MFP 1 also includes a management unit, shown as CPU 17 in FIG. 1, that runs an operating system supporting function modules of the following control services: network control service (NSC) 3, use information control service (UCS) 4, system control service (SCS) 5, and operation panel control service (OCS) 6. Each of the function modules 3-6 operates to control a connected hardware resource, manage setting information, or control a displaying window. The operating system of the CPU 17 also supports an application program interface (API) and multiple application functions 2, including the functions of a printer, a copier, a facsimile machine, and a scanner. The copier and scanner application functions are used to control a scanning unit of the MFP 1 that is configured to optically scan a document. The MFP 1 also includes a facsimile unit that is controlled by the facsimile application function to transmit and receive information via facsimile communication.

Data sent from one of host computers 12-16 is transmitted via the interface 7 to the MFP 1 through a network line 11. The input data is processed by the NCS 3, which is coupled to the interface 7, and is sent to one of the other control services 4-6, or to one of the applications 2.

Data can also be inputted to the MFP 1 via the operation panel 10, and such input data is processed by the OCS 6, which is coupled to the operation panel 10. The data is subsequently sent to one of the other control services 4-6, or to one of the applications 2.

The UCS 4 receives data including user information sent from the NCS 3 or the OCS 6 and registers this data in a memory area in the MFP 1 including an address book 8, which is coupled to the UCS 4. Furthermore, the UCS 4 executes a verification process for determining a verification of a user's identity based on, for example, login processing. The SCS 5 manages a basic setting memory area 9 that relates to operation of the whole system of the MFP 1.

The host computers 12-16 and the operation panel 10 can include touchscreen displays to display the various operating displays hereinafter described or can include non-touchscreen displays that require the use of an additional user interface device (e.g., a keyboard) to activate the virtual buttons or keys of the various displays. Thus, depending on the particular configuration of the host computers 12-16 and of the operation panel 10, selecting a key of one of the displays can be performed by applying pressure to a corresponding portion of a touchscreen, or by positioning a pointer icon over the key and pressing a button on a user interface device coupled to the device.

Figure 2:
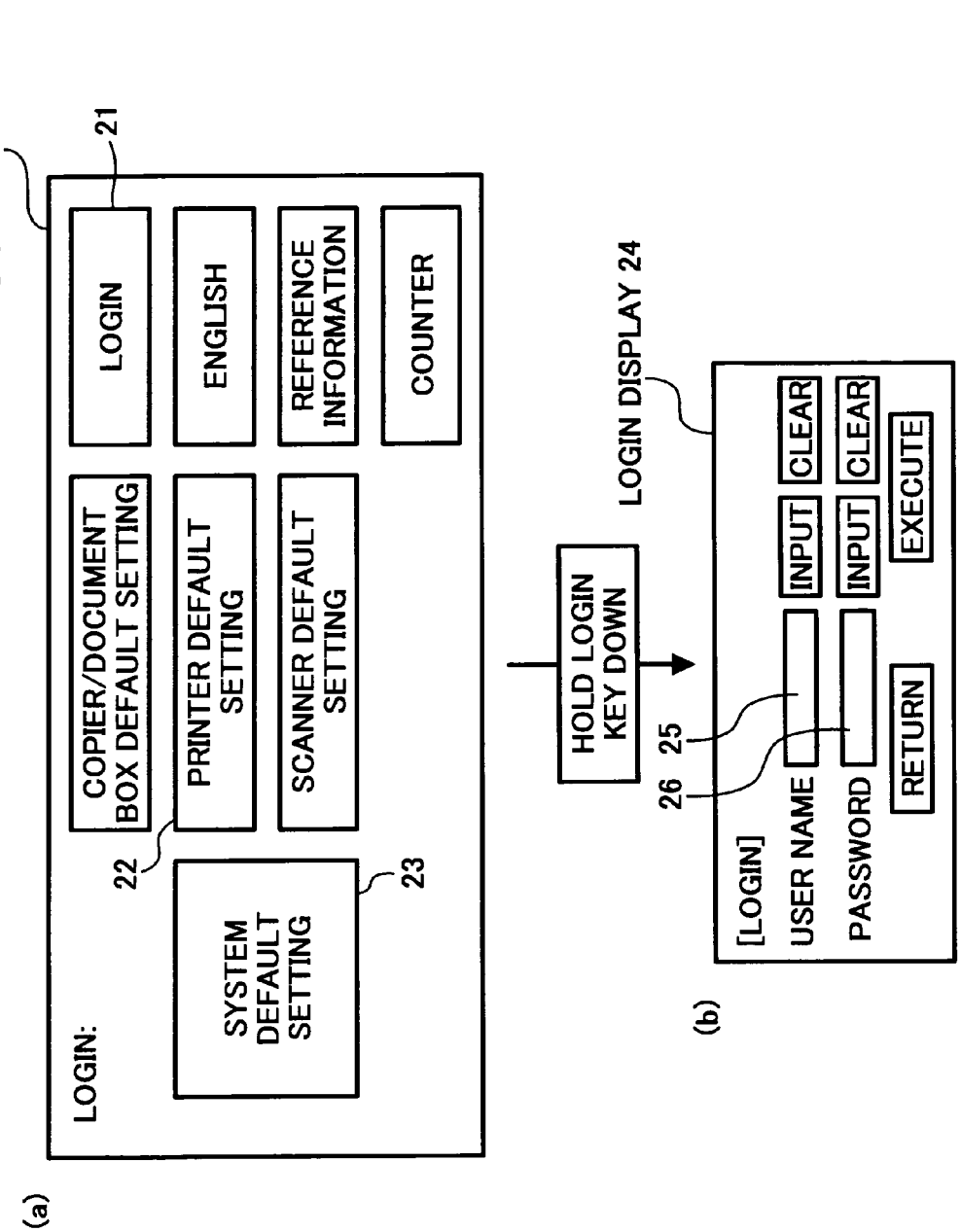
FIG. 2 is a two-part diagram illustrating (a) a representation of an operation panel display and (b) a login display of the image forming apparatus of FIG. 1.

In one example of using the MFP 1, a user A without authority of a manager and a user B with authority of a manager are both preliminarily registered in the address book 8 by the UCS 4 in response to data inputted from the interface 7 or from the operation panel 10. Part (a) of FIG. 2 shows an example of an operation panel display 20 that is shown on the operation panel 10. The operation panel display 20 can also be shown on the displays of the host computers 12-16 for remote control and management of the MFP 1. Part (b) of FIG. 2 shows a login display 24 that is displayed when the "login" key 21 of the operation panel display 20 is selected.

Part (a) of FIG. 3 shows the operating panel display 20 after user A has logged in. Part (b) of FIG. 3 illustrates a printer default setting window 27 after the "printer default setting" key 22 on the operating panel display 20 is selected. Part (a) of FIG. 4 shows the operation panel display 20, and part (b) of FIG. 4 illustrates a system default setting window 24a after the "system default setting" key 23 on the operating panel display 20 is selected.

Figure 6:
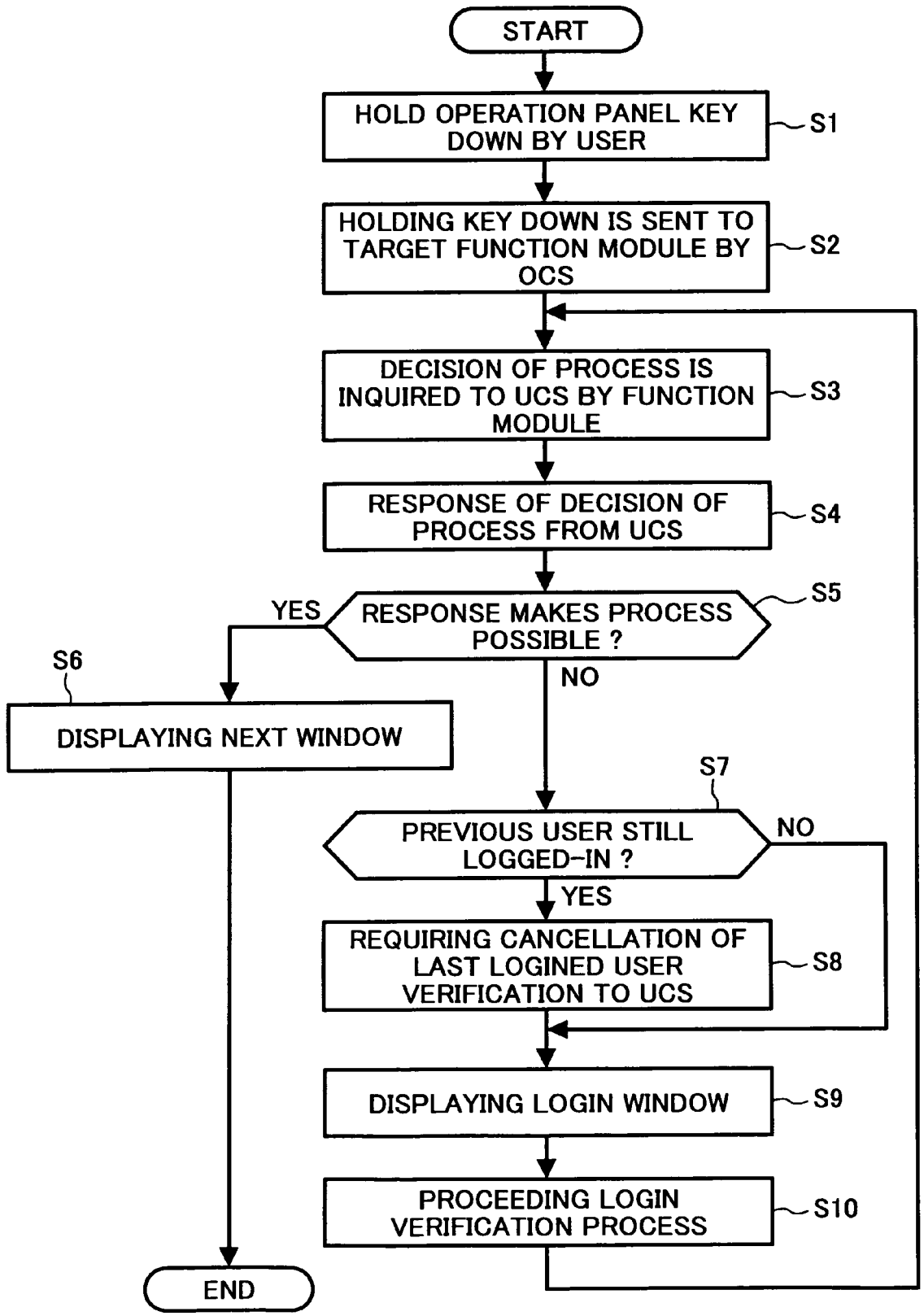
FIG. 6 is a flow chart illustrating an operating procedure performed in the image forming apparatus of FIG. 1 after an operation panel key is selected.

FIGS. 5 and 6 both illustrate processes performed in accordance with a first embodiment of the present invention. Each processing operation of the first embodiment of the present invention is explained based on FIG. 6 with reference to FIGS. 1-5.

FIG. 5 illustrates a user registration process sequence for the MFP 1, in which user information, including authorization or hierarchy information, for users A and B is registered into the address book 8. The host computers 12-16 and the operation panel 10 can all be used as registration units for registering user information. In the illustrated example, user information for user A is registered from the host computer 12 through the network 11 and is passed through the NCS 3 and the UCS 4 to the address book 8. In contrast, the user B is registered from the operation panel 10, and the user information of user B is transferred to address book 8 via the OCS 6, the SCS 5, and the UCS 4.

An exemplary operation of the MFP 1 by the user A, who does not have the authority of a manager, is now described.

As shown in FIG. 6, in response to a pressing of a key on the operation panel window 20 displayed on the operation panel 10 (step S1), the OCS 6 transmits a signal to a target function module, which is one of the control services 3-5 or one of the applications 2 corresponding to the selected key (step S2). The target function module refers to the UCS 4 (step S3), which determines if the requested operation corresponding to the selected key should be permitted based on user authority (step S4). In making such a determination, as described in more detail below, the UCS 4 refers to a user authority table (FIG. 18), which indicates the operations that are available to each type of user that uses the MFP 1. The function module then receives the authorization indication from the UCS 4 and determines if the requested operation should be permitted or not (step S5). If the operation is permitted ("Yes" in response to decision step S5), the function module activates the appropriate subsequent display on the operation panel 10 (step S6).

FIG. 18 illustrates the user authority table, to which the UCS 4 refers in response to a request from another control service in step S3 in FIG. 6. The user authority table is stored in the address book 8 and indicates which operations of the MFP 1 are executable or not executable based on the type of user that is logged into the MFP 1. For example, referring to FIG. 18, the adjustment of "buzzer sound" in the "basic setting" category is executable by a user manager, but is not executable by a general user, who does not have manager-level authorization.

Figure 7:
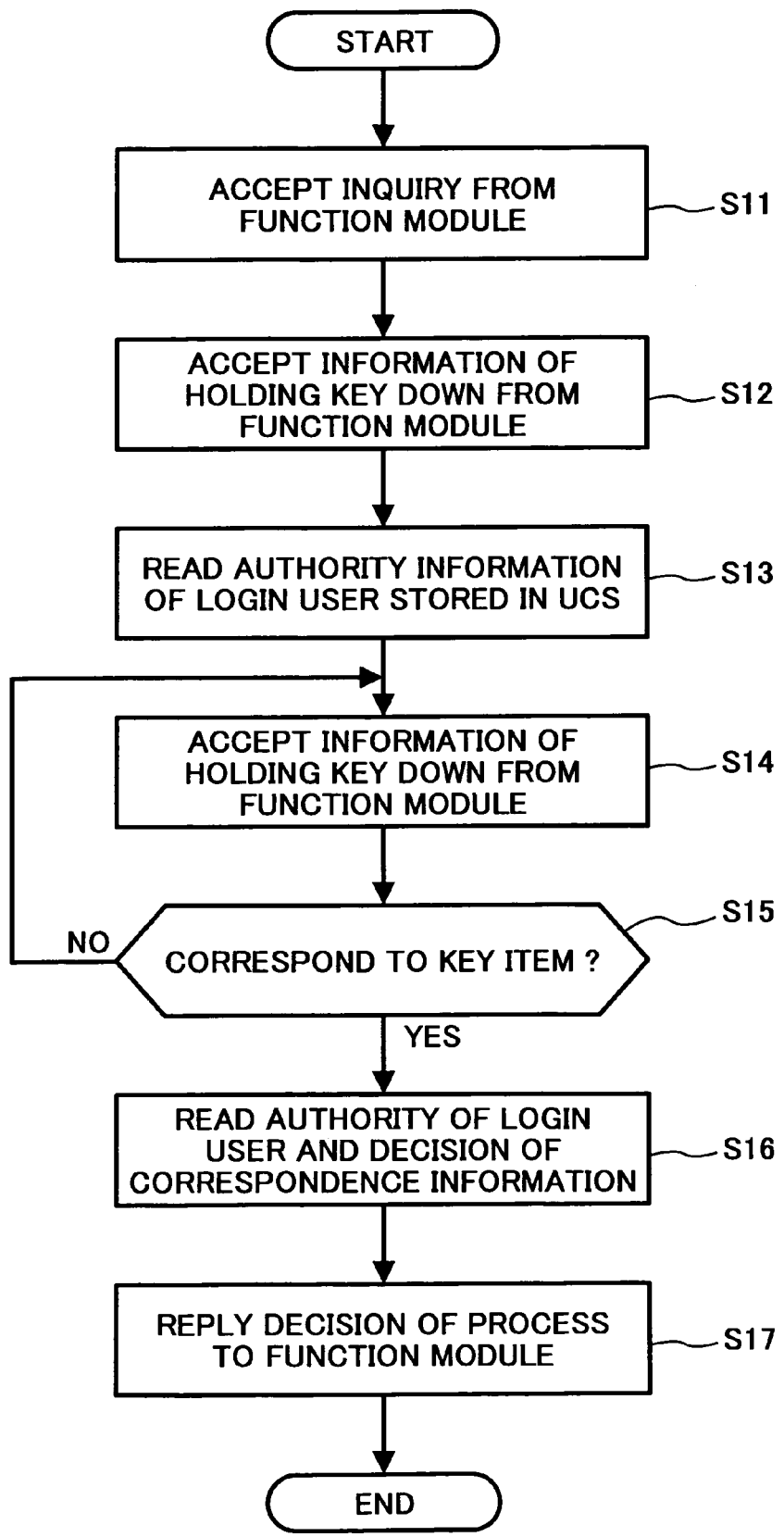
FIG. 7 is a flow chart illustrating an operating procedure performed in the image forming apparatus of FIG. 1 to determine if a requested operation is permitted based on user authority information.

FIG. 7 is a flow chart illustrating the process steps performed by the UCS 4 in making an authorization determination. Initially, the UCS 4 receives a reference request from another function module (in process step S3 of FIG. 6) to determine if a current, logged-in user is authorized to request a particular operation (step S11). The UCS 4 then accepts information relating to the pressing of the corresponding key on the operation panel display 20 (step S12). The authority information corresponding to the current user stored inside the UCS 4 is then read out (step S13), as is one of the key items from the user authority table shown FIG. 18 (step S14). The UCS 4 then determines if the retrieved key item corresponds to selected key (step S15). If there is no correspondence ("No" in response to decision step S15), the process returns to step S14 to read out the next key item in the user authority table. If a correspondence exists ("Yes" in response to decision step S15), the UCS 4 then determines if the requested operation is executable or not executable, based on the authority of the current user and the information in the user authority table (step S16). The result of determining user authorization with respect to the requested operation is then transmitted to the requesting function module (step S17).

Referring to FIG. 2 and to the login process sequence illustrated in FIG. 5, when the "login" key 21 of the operation panel window 20 is pushed down, the authorization determination is performed by the process explained above with respect to steps S1-S5 of FIG. 6. Further, in process step S6, the login window 24 is displayed. A user name of the user A is input into an input area 25, and a password of user A is input into a password input area 26 of the login window 24. This verification information is stored in a memory of the MFP 1, and user A is thus logged into the MFP 1.

In the login process, the authorization determination is performed by the UCS 4 by comparing user information of user A with authority information stored in the address book 8. As shown in FIG. 3, when login of user A is permitted and is successful, the appropriate user name and login state are displayed in the operation panel window 20 and a state of login is also indicated. Alternatively to the example shown in FIG. 3, the "login" key 21 can be changed to display the term "log-out," as shown in FIG. 4.

A processing sequence of a printer default setting is explained below, with user A being logged into the MFP 1. Referring to FIG. 3, when user A presses the "printer default setting" key 22 in the operation panel window 20 on the operation panel 10, the process steps S1-S5 shown in FIG. 6 are performed. Specifically, the pressing of the "printer default setting" key 22 results in a corresponding signal being sent from the OCS 6 to the SCS 5, which requests an authorization determination from the UCS 4 regarding the requested operation. Because the "printer default setting" operation is executable for user A ("Yes" in response to decision step S5), the printer default setting window 27 is displayed (step S6), and the MFP 1 awaits further input instructions from user A. For example, at the end of the "printer default setting" operation, user A can press the "END" key 28. In response, the SCS controls the operation panel 10 to again display the operation panel window 20.

The processing sequence of a "system default setting" request, as shown in FIG. 5B, is explained below, with user A being logged into the MFP 1. When the "system default setting" key 23 of the operation panel display 20 is selected, the MFP 1 determines if user A is authorized to request such an operation (step S5 in FIG. 6). Because a "system default setting" operation is only executable for a user with manager-level authority (e.g., user manager, network manager, etc.), as indicated in FIG. 18, the operation is not executable for the user A ("No" in response to step S5). The MFP 1 then confirms that user A is logged-in (step S7). When it is confirmed that user A is a user without authority of a manager ("Yes" in response to decision step S7), a cancellation request of the log-in of user A is sent to the UCS 4 and the user verification for user A is canceled (step S8). Next, a login window is displayed (step S9).

In order to receive and process a login verification by a user with an authority level that can successfully request performance of the operation, the login display 24 shown in FIG. 4 is again displayed. Further, in the process step S7, if user A is not logged-in ("No" in response to decision step S7), the login display 24 is displayed.

In the login display 24, a name of user B, who has authority of a manager, is entered into the user name input area 25 and a corresponding password is entered into the password input area 26. The login process, as described above, is performed for user B (step S10) and, afterwards, the process advances to step S3 of FIG. 6 to again determine if the "system default setting" operation is executable for the current user, in this case user B. Because user B has manager-level authority, the operation is executable, as determined in steps S3-S5. The window 24 shown in FIG. 4 is then displayed (step S6), and the MFP 1 then awaits further requests from user B.

By the above-described processes, the MFP 1 can perform an authorization determination for every operation request based on user authorization information. Consequently, a burden of a verification can be reduced by providing an image forming apparatus, such as the MFP 1, with the capability to request appropriate verifications of users demanding particular operations. Because the image forming apparatus includes a management unit configured to manage login processing of multiple users and the operability of the apparatus with respect to users of different authority or hierarchy, the apparatus can be used without a user being conscious of authorization processing. Also, the confidentiality of data stored in the image forming apparatus is maintained, as only users with the proper level of authority can access the data.

Figure 8:
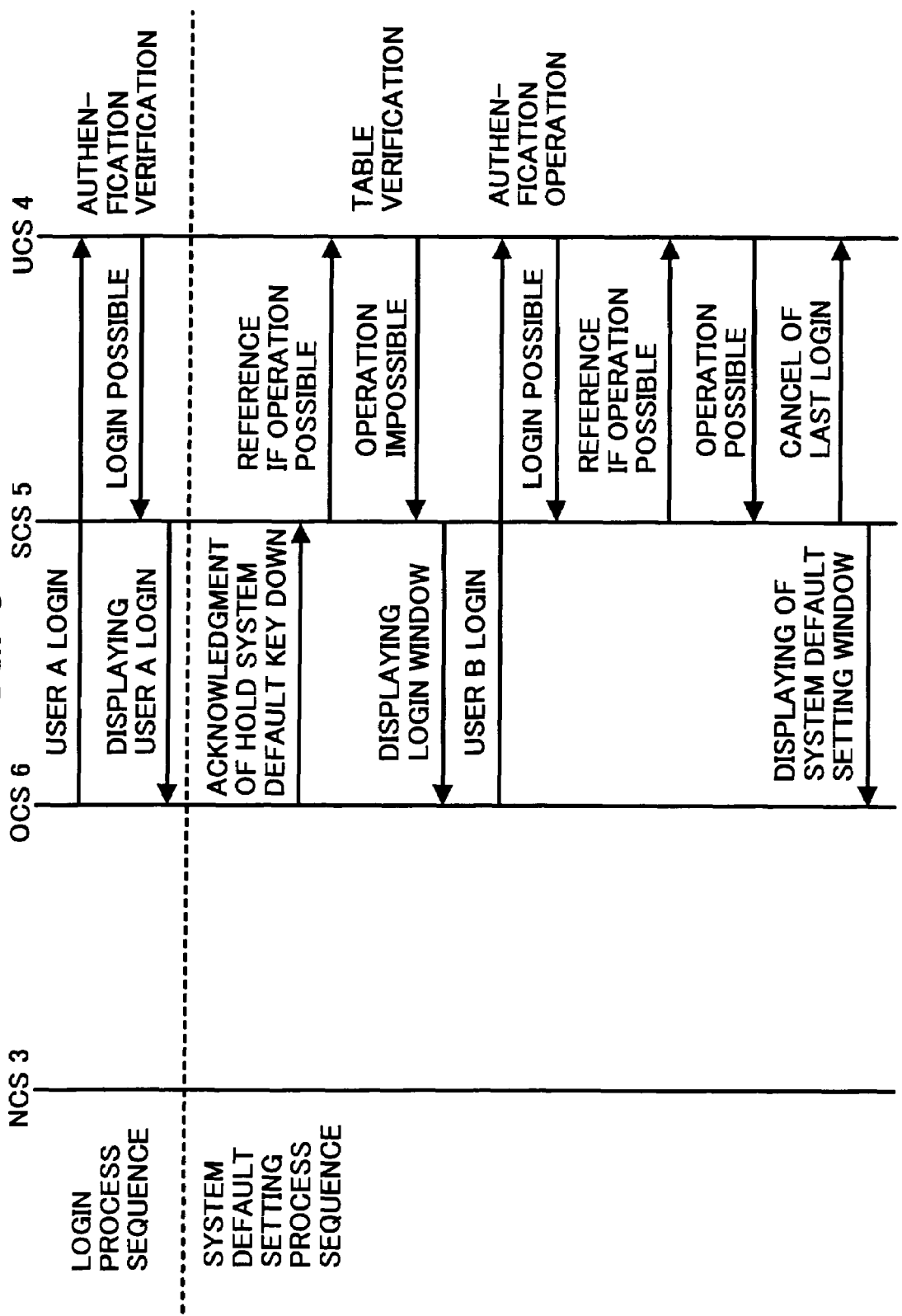
FIG. 8 is a sequence chart illustrating processes performed during operation of the image forming apparatus of FIG. 1 in accordance with a second embodiment of the present invention.
Figure 9:
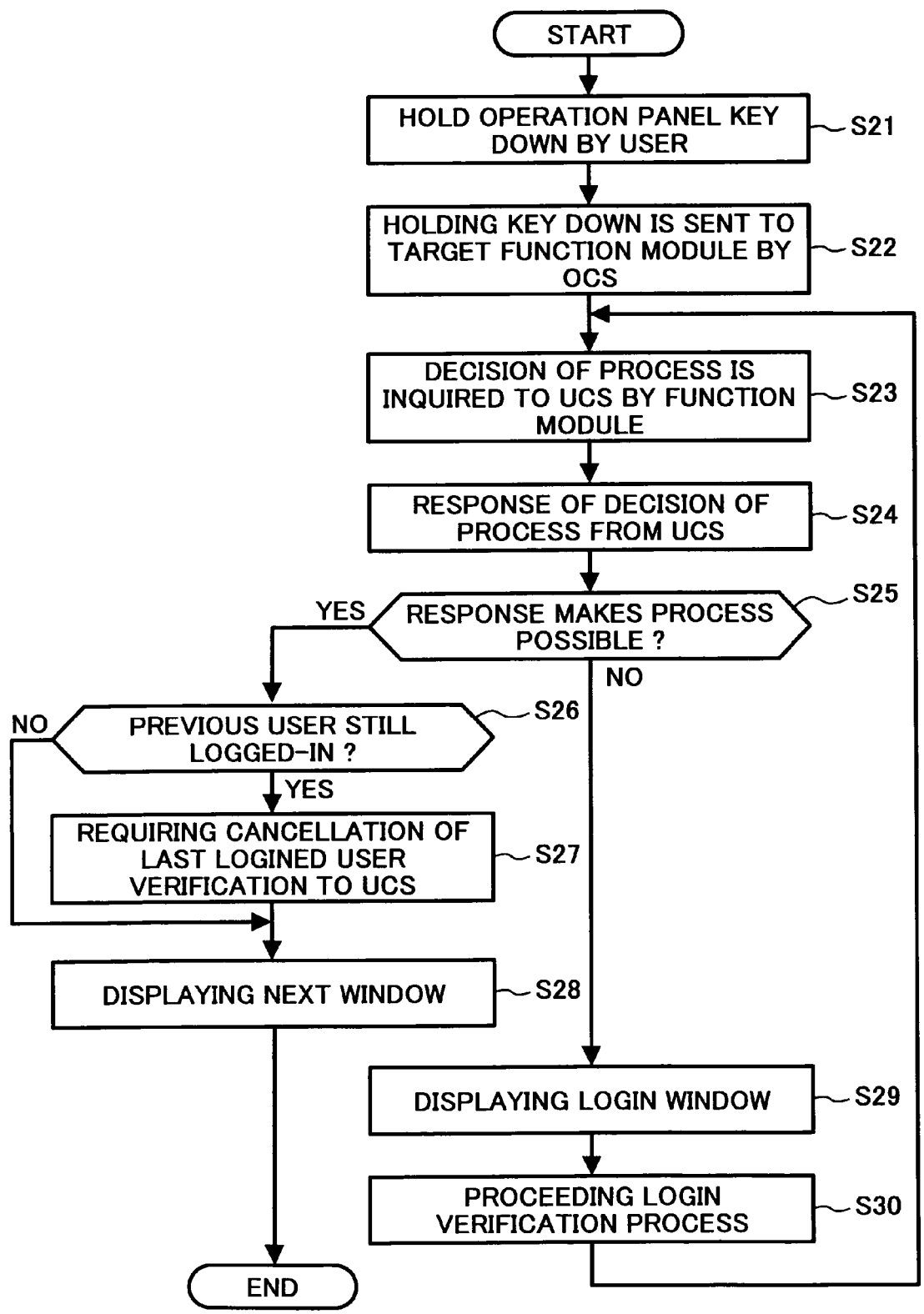
FIG. 9 is a flow chart illustrating an operating procedure performed in the image forming apparatus of FIG. 1 after an operation panel key is selected in accordance with the second embodiment of the present invention.

FIGS. 8 and 9 illustrate a processing sequence performed by the MFP 1 in accordance with a second embodiment of the present invention, which uses the same basic structure of the MFP 1 in FIG. 1. The requesting of a "system default setting" operation is explained below in accordance with the second embodiment of the present invention. In this example, the current user is user A, who does not have manager authority.

Steps S21-S25 of FIG. 9 are similar to steps S1-S5 of FIG. 6. For example, a key is selected on the operation panel window 20 displayed in the operation panel 10 (step S21), and the OCS 6 transmits a signal corresponding to the key click to a target function module, i.e., control service or application (step S22). The target function module requests that the UCS 4 determine if the requested operation is executable (step S23). As described above, the UCS 4 refers to the user authority table of FIG. 18 to determine if the logged-in user has the proper authority level to execute the requested operation (step S24). The function module then receives the authorization result from the UCS 4 and determines if the requested operation should be executed (step S25).

When the "system default setting" key 23 of the operation panel 20 shown in FIG. 4 is selected, the authority level of the logged-in user is checked by the UCS 4 to determine if this operation is executable. In this example, because user A does not have the authority of a manager, execution of the "system default setting" operation is not possible ("No" in response to decision step S25). In accordance with the second embodiment of the present invention, the login window 24 shown in FIG. 4 is then displayed (step S29).

In the login window 24, the user B, who has the authority of a manager, inputs a user name into the input area 25 and a password input into the password input area 26; login of user B is then performed by storing the verification information of user B in the MFP 1 (step S30). After the process step S30 is performed, step S3 is again performed to determine if the requested "system default setting" operation can be executed. Because user B has the authority of a manager, the UCS 4 determines that the operation is executable ("Yes" in response to decision step S25), and the management unit determines if the previous user, user A, is still logged-in (step S26). In accordance with the second embodiment of the present invention, if user A is still logged-in ("Yes" in response to decision step S26), then user A is automatically logged-out from the MFP 1 (step S27). When user A is not logged into the MFP 1 at step S26 ("No" in response to decision step S26), a "system default setting" operation window (similar to the printer default setting window 27 in FIG. 3) is displayed (step S28). From this window, the process can be executed based on instructions from the manager-level user B.

Figure 10:
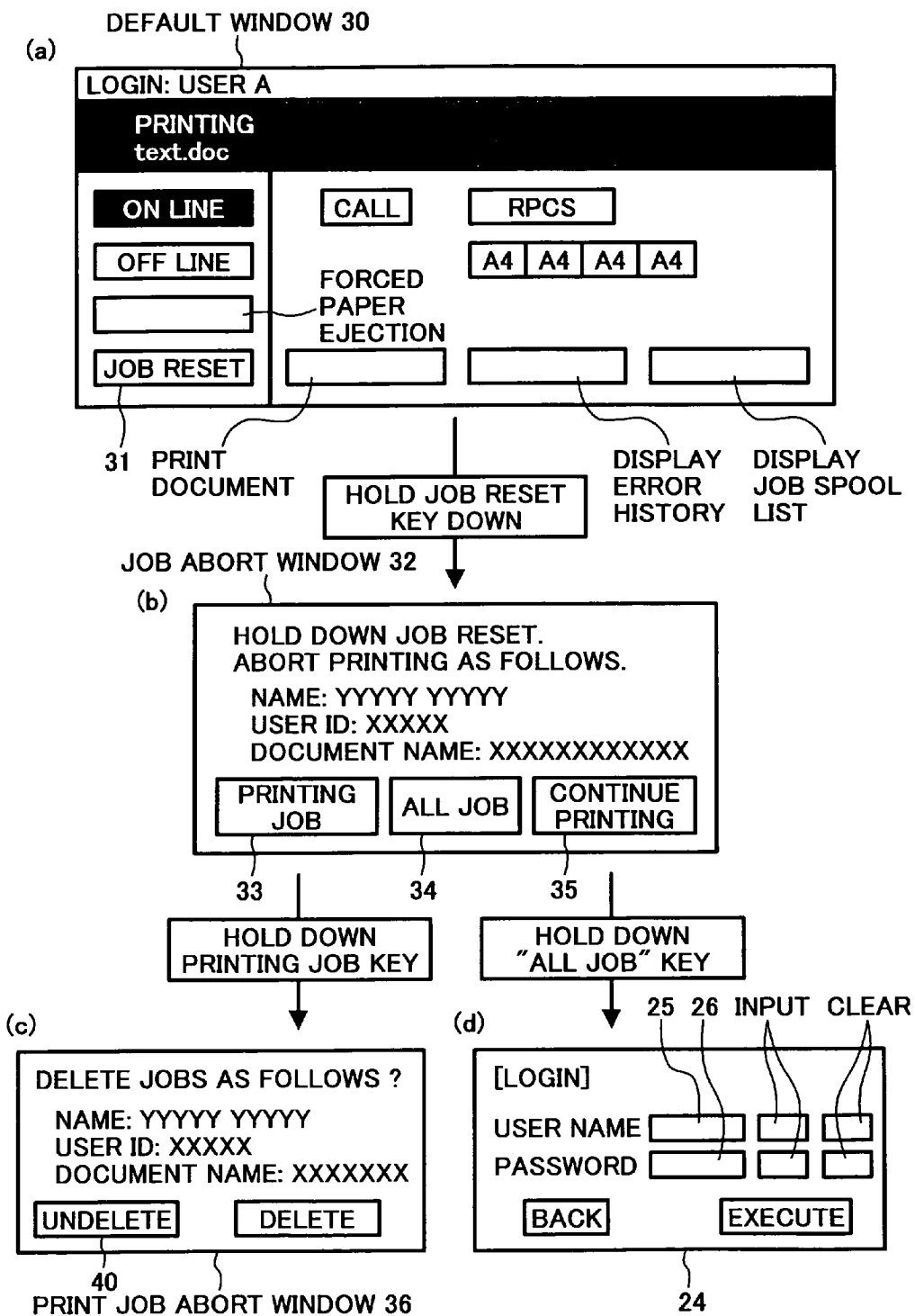
FIG. 10 is a four-part diagram illustrating (a) a default display during a job operation in accordance with a third embodiment of the present invention, (b) a display corresponding to a job reset request, (c) a display corresponding to a job reset request during a print job, and (d) a display corresponding to the selection of an "all job" reset request.
Figure 11B:
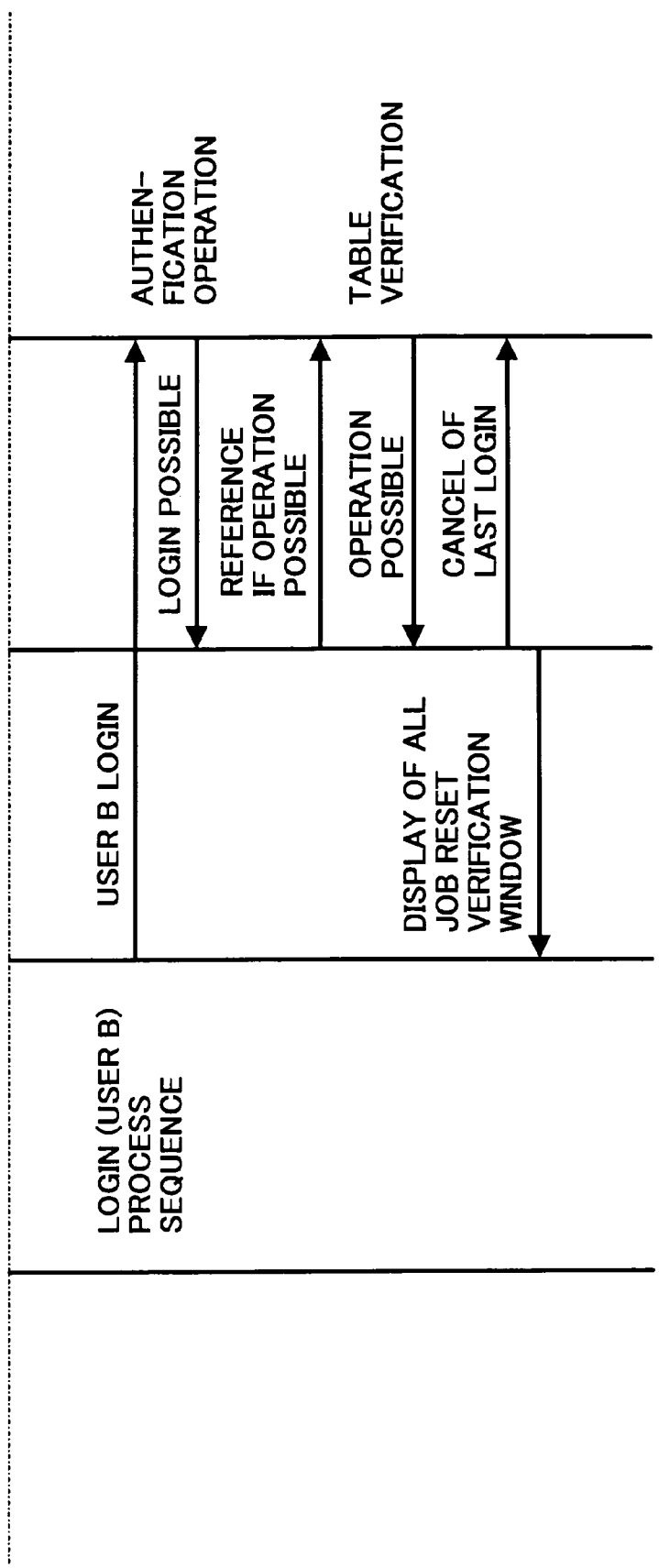
FIG. 11 is a sequence chart illustrating processes performed during operation of the image forming apparatus of FIG. 1 in accordance with the third embodiment of the present invention.

A third embodiment of the present invention is now described with reference to FIGS. 10 and 11. FIG. 10 is a four-part diagram illustrating (a) a default display during a job operation, (b) a display corresponding to a job reset request, (c) a display corresponding to a job reset request during a print job, and (d) and a display corresponding to the selection of an "all job" reset request. FIG. 11 is a sequence chart illustrating processes performed in accordance with the third embodiment of the present invention.

Referring to the "login (user A) process sequence" shown in FIG. 11A, user A is logged into the MFP 1 via the operational panel 10 and the OCS 6. During execution of a print job by the MFP 1, the default window 30 shown in FIG. 10 is displayed on the operation panel 10.

When the "job reset" key 31 is pushed down on the default window 30, a job abort window 32 is displayed, as shown in part (b) of FIG. 10. The job abort window 32 includes the following selectable keys: a "printing job" key 33, an "all job" key 34, and a "continue printing" key 35. When the "printing job" key 33 or the "continue printing" key 35 are selected, the MFP 1 executes the corresponding operation without checking the authorization level of the current user, because the current user already has the authorization to control the specific pending job. However, the "all job" operation may relate to jobs not requested by the current user, and thus when the "all job" key 34 is selected from the job abort window 32, a verification of whether the current user can successfully request execution of this operation is performed by the UCS 4.

Specifically, when the "all job" key 34 is selected, the UCS 4 determines if the "all job" operation is executable in view of the authorization level of the current user (step S23 in FIG. 9). Because user A does not have manager-level authorization, the "all job" operation is not executable, and the login window 24 is displayed to request verification of a new user with the authority of a manager. When a verification of user B is entered into the login window 24 ("login (user B) process sequence" in FIG. 11B) and is confirmed by the MFP 1, the UCS 4 once again verifies if the "all job" process can be executed. When the "all job" operation is judged by the UCS 4 to be executable, the previously-logged-in user, user A, is logged-out ("cancel of last login" in FIG. 11B) and an "all job abort" window (similar to the "print job abort window" 36) is displayed. The MFP 1 then waits for further instructions from the user B.

In accordance with this embodiment of the present invention, when a general user requests an operation that can only be executed for a manager-level user, the management unit of the image forming apparatus stores a verification of the general user until a manager user is logged-in. If a manager user does not log into the image forming apparatus, the operation of the apparatus continues with the general user being the current user, and the second verification operation is canceled.

Figure 13B:
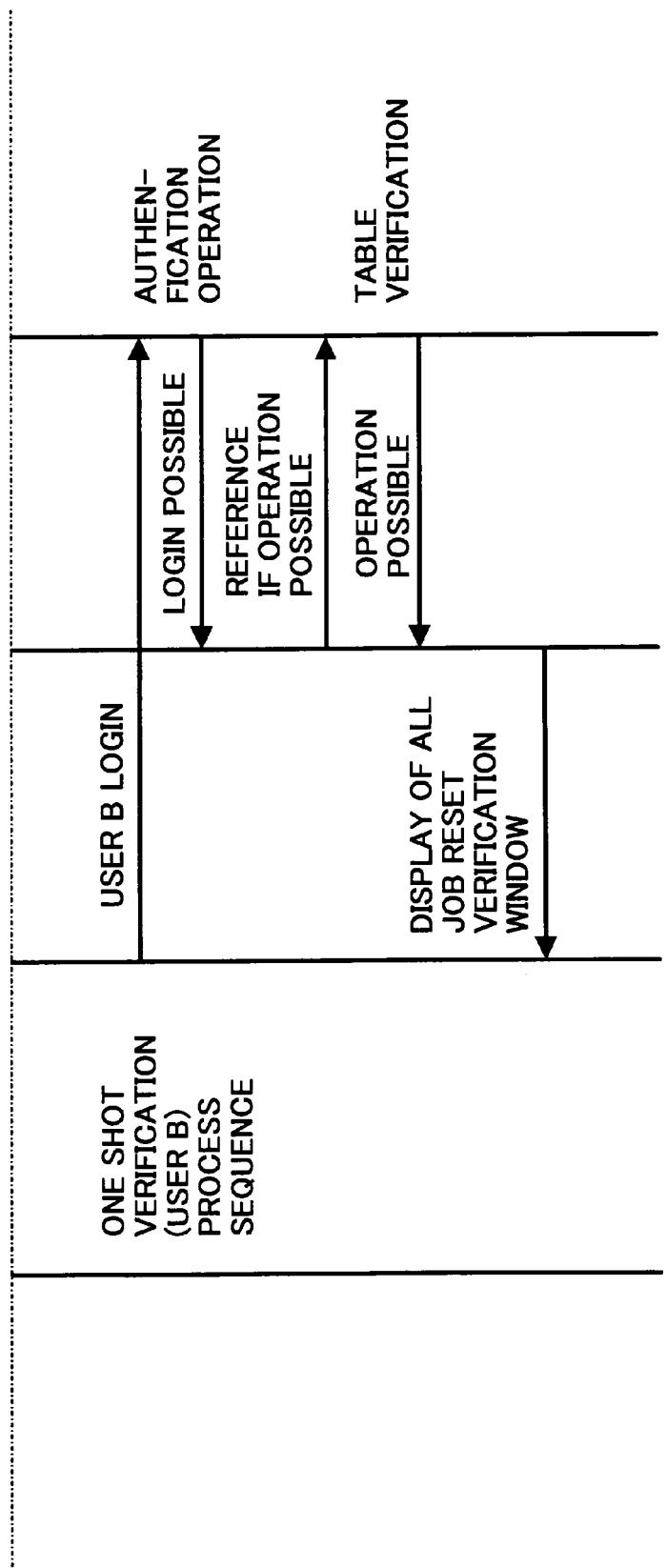
FIG. 13 is a sequence chart illustrating processes performed during operation of the image forming apparatus of FIG. 1 in accordance with the fourth embodiment of the present invention.

A fourth embodiment of the present invention is described below with reference to FIGS. 12 and 13. FIG. 12 is a four-part diagram illustrating (a) a default display during a job operation, (b) a display corresponding to a job reset request, (c) a display corresponding to a job reset request during a print job, and (d) a display corresponding to the selection of an "all job" reset request. FIG. 13 is a sequence chart illustrating processes performed during operation of the MFP 1 in accordance with the fourth embodiment of the present invention;

Referring to FIG. 12, when the "job reset" key 31 of the default window 30 is selected by logged-in user A, who does not possess authority of a manager, a job abort window 32 is displayed. In the job abort window 32, when the "printing document" key 33 is pushed down in order to reset the current processing job, the print job abort window 36 is subsequently displayed, and user A can execute the operation.

On the other hand, when user A presses the "all job" key 34, the one shot verification window 37 is displayed; the deleting of all printing data is not performed in response to the request because user A is not a manager user. When a user name of user B, who has manager-level authority, is entered in the input area 38 and a corresponding password is entered in the input area 39, the verification is confirmed and the "all job" reset can be processed after the display of an all job reset verification window (see FIG. 13). After the "all job" reset process by user B is executed, user B is logged-out, and the MFP 1 once again reverts to control by user A, who was previously logged-in.

In this embodiment, a manager user is able to temporarily log into the image forming apparatus to execute a particular operation that requires manager-level authorization. This method does not cancel the verification of the previously-logged-in user, who is a non-manager. In this way, the present invention provides for execution of an operation without logging-out the previous, non-manager user and by allowing a temporary verification by a manager user.

Figure 14:
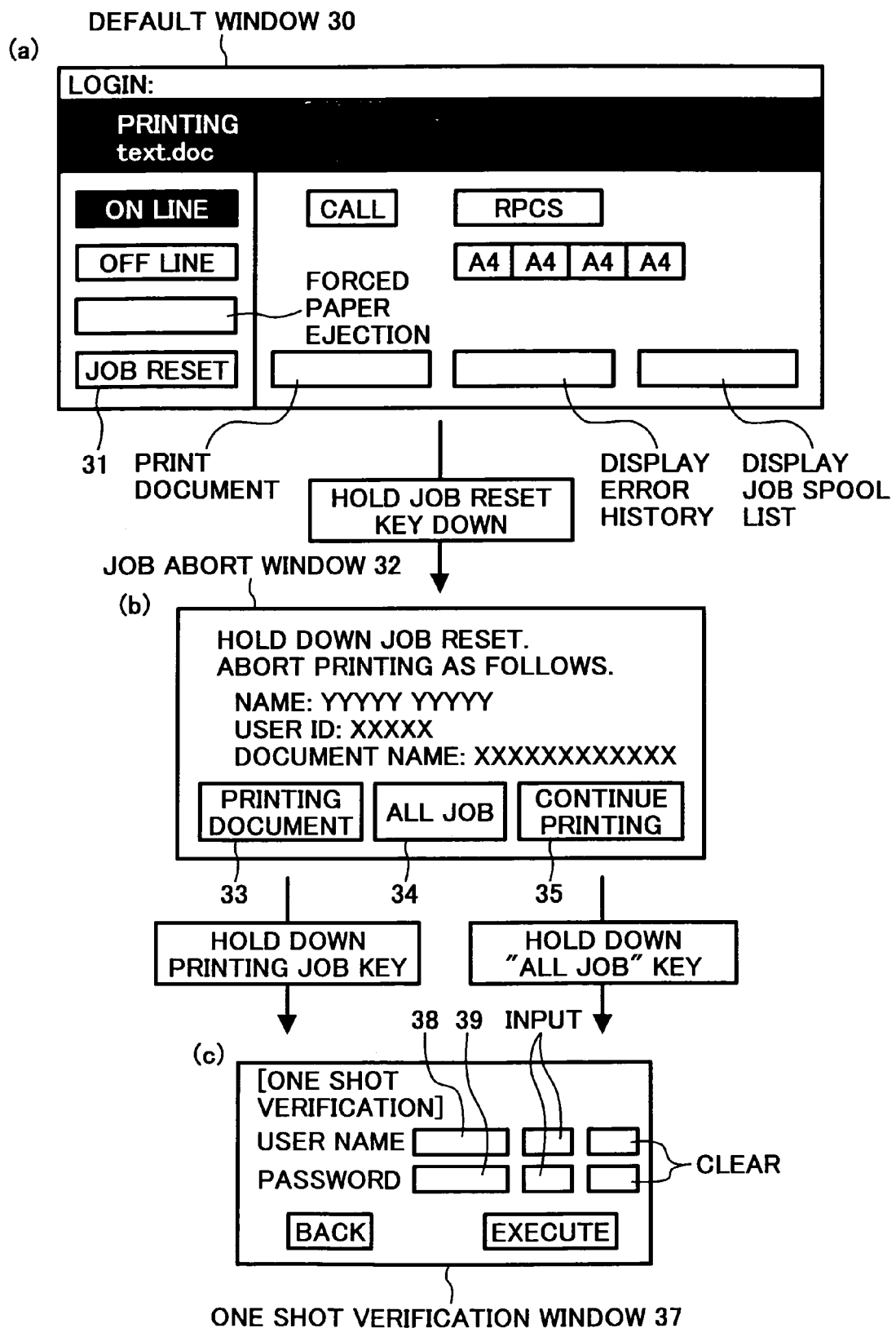
FIG. 14 is a diagram illustrating (a) a default display during a job operation in accordance with a fifth embodiment of the present invention, (b) a display corresponding to a job reset request, and (c) a display corresponding to a job reset request for a print job or an "all job" reset.
Figure 15B:
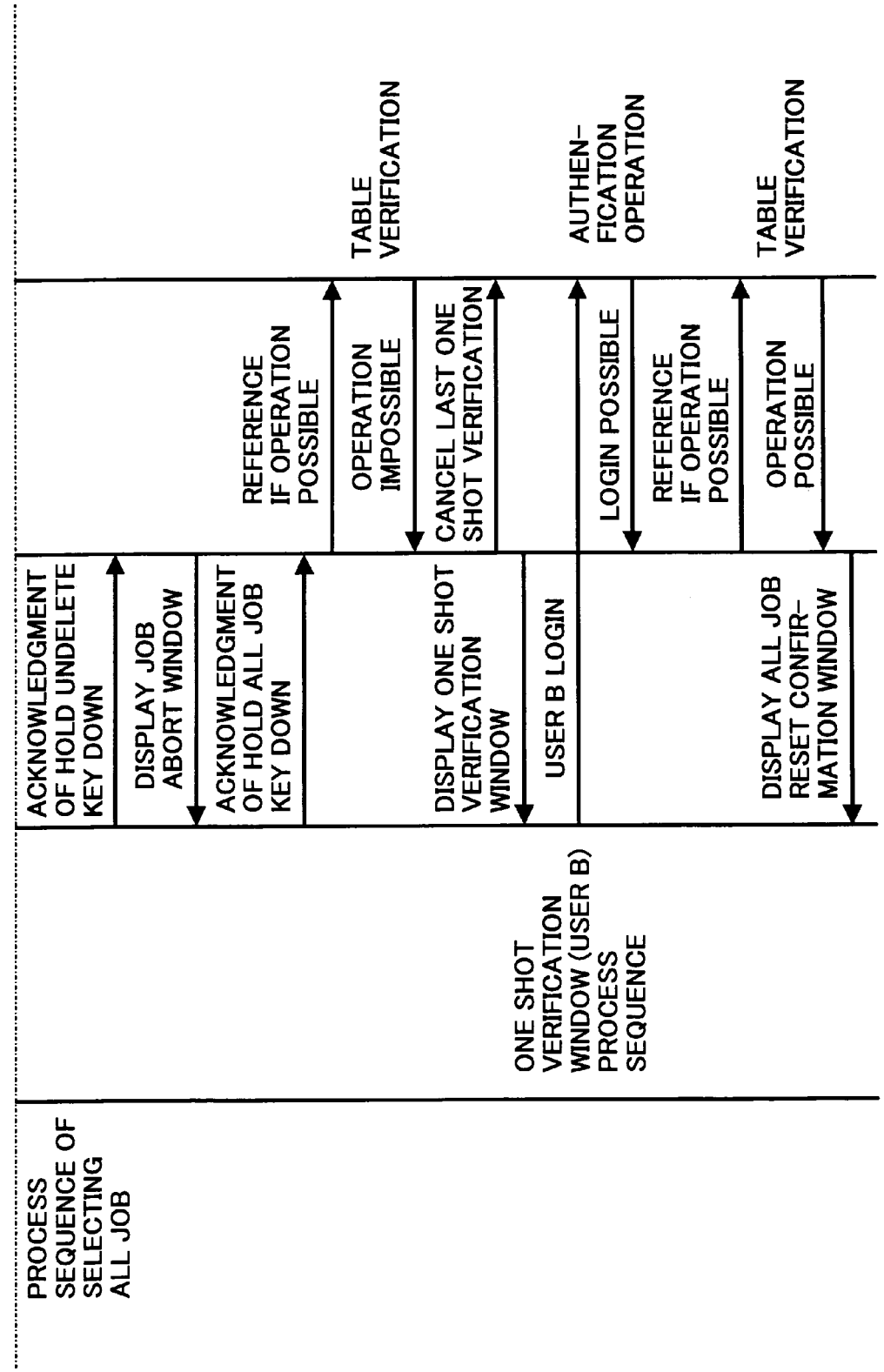
FIG. 15 is a sequence chart illustrating processes performed during operation of the image forming apparatus of FIG. 1 in accordance with the fifth embodiment of the present invention.

A fifth embodiment is now described with reference to FIGS. 14 and 15. FIG. 14 is a diagram illustrating (a) a default display during a job operation, (b) a display corresponding to a job reset request, and (c) a display corresponding to a job reset request for a print job, or an "all job" reset. FIG. 15 is a sequence chart illustrating processes performed during operation of the MFP 1 in accordance with the fifth embodiment of the present invention.

In the fifth embodiment of the present invention, when the "printing document" key 33 or the "all job" key 34 is selected in job abort window 32 after the "job reset" key 31 is selected in default window 30, a one shot verification window 37 is displayed. In this embodiment, each process that requires a one-shot verification by a manager-level user in order to be executable is performed only once by the MFP 1.

When the "job reset" key 31 is selected when no users are logged into the MFP 1, the job abort window 32 is displayed. If the "printing document" key 33 is pushed down, the one shot verification window 37 is displayed. When a user name of user A, who is a non-manager user, is entered in the input area 38 and a corresponding password is entered in the input area 39, the verification is confirmed and a window similar to the print job abort window 36 shown in FIG. 10 is displayed.

Referring to FIG. 10, when the "undelete" key 40 is selected without resetting the current printing job, the display of the operation panel 10 reverts back to the job abort window 32. When the "all job" key 34 is selected by logged-in user A, the UCS 4 determines if the "all job" process is executable. Because user A does not have manager-level authority, the one shot verification window 37 is displayed again, and a verification of user A is then canceled.

Subsequently, when a user name of user B, who has manager-level authorization, is entered in the input area 38 of the one shot verification window 37 and a corresponding password is entered in the input area 39, the verification of user B is confirmed, and the "all job" reset operation can be performed.

In this embodiment, the accidental deletion of all stored printing data, including confidential data, by a general user is avoided. Specifically, only a manager-level user can manage the handling of print data corresponding to different jobs.

FIG. 16 illustrates an alternative process sequence of the fifth embodiment of the present invention. When the "all reset" job process is selected by user A, who is currently logged in, the UCS 4 determines that the operation cannot be executed because user A is not a manager ("operation impossible" in FIG. 16B). The one shot verification window 37 (FIG. 14) is then displayed. However, instead of canceling the verification of user A when the one shot verification window 37 is displayed in this alternative embodiment, user A is logged-out only after verification from user B is confirmed via the one shot verification window 37.

If user B does not log into the MFP 1, an additional login process for obtaining the verification of user A is not needed as the previous verification of user A is stored in the MFP 1. Thus, operation errors associated with re-verifications can be reduced and the operability of the MFP 1 can be improved.

A sixth embodiment of the present invention is described below with reference to FIG. 17, which illustrates (a) a display of a system default setting and (b) a display of a job reset authorization setting. In previously-described embodiments of the present invention, only a manager user is capable of successfully requesting an "all job" reset operation. However, in the sixth embodiment of the present invention, an adaptive range of users who are permitted to request an "all job" reset operation can be modified by a manager. With this capability, even general users may be permitted to request an "all job" reset operation.

Figure 17:
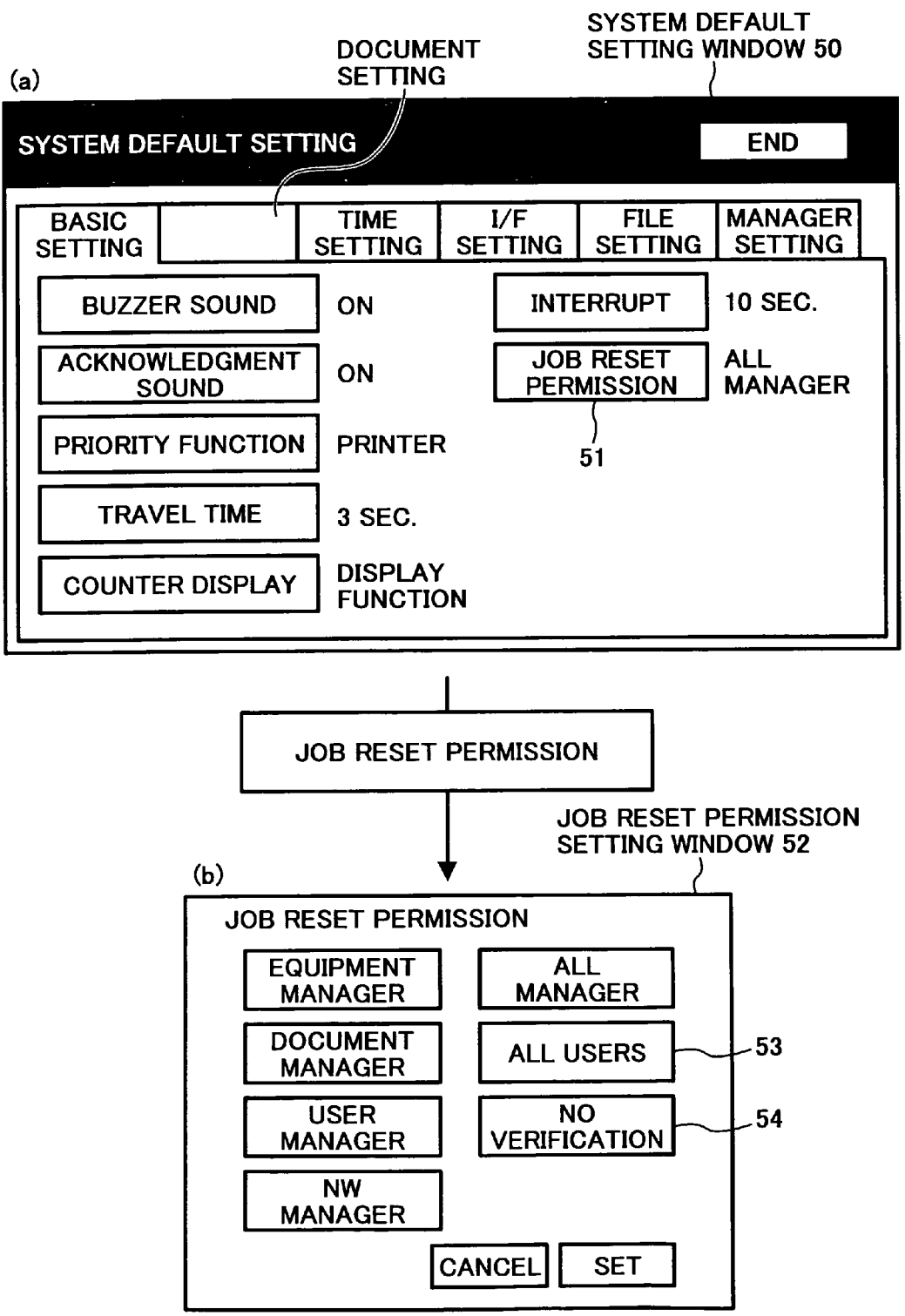
FIG. 17 is a two-part diagram representing a sixth embodiment of the present invention, illustrating (a) a display of a system default setting and (b) a display of a job reset authorization setting.

Part (a) of FIG. 17 illustrates a system default setting window 50 that is displayed on the operation panel 10 and that allows modification of the adaptive range of users that can request an "all job" reset operation. A login process is first executed by user B, who is a manager, from the operation panel display 20 shown in FIG. 4. When the "system default setting" key 23 is pushed down, the system default setting window 50 shown in FIG. 17 is displayed.

When the "job reset permission" key 51 in the system default setting window 50 is selected, the window shifts to the job reset permission setting window 52 shown in FIG. 17. If the "all user" key 53 is selected by user B, the corresponding operation is executed. Consequently, all types of logged-in users, including non-manager users, can successfully request an "all job" reset operation. Further, by selecting the "no verification" key 54 in the job reset permission setting window 52 of FIG. 17, user B can allow all users of the MFP 1 to request an "all job" reset even if they are not logged-into the MFP 1.

In addition, when the MFP 1 is in a service maintenance mode, in which repairs and adjustments of the apparatus are made, all maintenance functions are given priority. In this special mode, service personnel are allowed to operate all aspects of the MFP 1, including job reset operations, after entering a pre-determined code or sequence of key selections (e.g., a number combination via the operation panel 10) instead of logging in via a display window.

As described above, in this embodiment, the apparatus allows a manager to select a range of permitted users for an "all job" reset operation to be (1) all users with login verification, (2) or all users, verified or unverified. Also, the sixth embodiment of the present invention provides for a special maintenance mode to allow service personnel to gain control of the MFP 1 without going through a normal login process (e.g., requiring a user name and password). Moreover, further to the example illustrated in FIG. 17, the job reset permission setting window 52 can be used to register or modify the user identifications and passwords for each manager and general user.

As described above, the various aspects of the present invention provide for an image forming apparatus that can determine the authorization levels of users. Because the confidentiality of stored data is maintained and an appropriate verification is demanded for each user requesting an operation, the burden for verification can be reduced. Also, the image forming apparatus of the present invention is useful for using print managing information to maintain a confidentiality of the print data.

Obviously, numerous modifications and variations of the present invention are possible in light of the above teachings. It is therefore to be understood that within the scope of the appended claims, the present invention may be practiced otherwise than as specifically described herein.

This patent document is based on and claims priority to Japanese patent application No. 2004-157343, filed on May 27, 2004, the entire contents of which are hereby incorporated herein by reference.

The invention claimed is:

1. An image forming apparatus comprising:
   a communication interface configured to couple to a network;
   a printing unit configured to process print data received via the communication interface;
   a registration unit configured to register a plurality of user information for a plurality of users, each of the plurality of user information including hierarchy information corresponding to one of the plurality of users; and
   a managing unit configured to determine if operations of the image forming apparatus requested by the plurality of users are executable based on the corresponding hierarchy information, and configured to manage a verification process for the plurality of users based on the corresponding hierarchy information.

2. The image forming apparatus of claim 1, wherein the registration unit includes an operation panel.

3. The image forming apparatus of claim 2, wherein the operation panel includes a touchscreen, and the first user requests the operation by selecting a key corresponding to the operation on the touchscreen.

4. The image forming apparatus of claim 1, further comprising:
   a scanning unit configured to optically scan a document; and
   a facsimile unit configured to transmit and receive information via facsimile communication.

5. The image forming apparatus of claim 1, wherein,
the registration unit is configured to allow a first user of the plurality of users to input hierarchy information of the first user, is configured to allow the first user to enter a verification information of the first user, and is configured to allow the first user to request one of the operations of the image forming apparatus, and
the management unit is configured to determine if the operation requested by the first user is executable based on the hierarchy information of the first user after the verification information of the first user is stored in the image forming apparatus.

6. The image forming apparatus of claim 5, wherein when the management unit determines that the hierarchy information of the first user does not allow for execution of the operation, the management unit is configured to delete the verification information of the first user and to request another verification information.

7. The image forming apparatus of claim 6, wherein the management unit requests the other verification information by controlling the registration unit to display a login window.

8. The image forming apparatus of claim 5, wherein when the management unit determines that the hierarchy information of the first user does not allow for execution of the operation, the management unit is configured to,
request another verification information,
delete the verification information of the first user when a new verification information is received, and
continue to store the verification information of the first user in the image forming apparatus when a new verification information is not received.

9. The image forming apparatus of claim 5, wherein when the management unit determines that the hierarchy information of the first user does not allow for execution of the operation, the management unit is configured to,
request and receive a verification information of a second user,
retrieve hierarchy information of the second user that is stored in the image forming apparatus, and
determine if the operation can be executed based on the hierarchy information of the second user while continuing to store the verification information of the first user in the image forming apparatus.

10. The image forming apparatus of claim 9, wherein when the management unit determines that the operation can be executed based on the hierarchy information of the second user, the management unit is configured to delete the verification information of the first user.

11. The image forming apparatus of claim 9, wherein when the management unit determines that the operation can be executed based on the hierarchy information of the second user, the management unit is configured to,
execute the operation once, and
delete the verification information of the second user while continuing to store the verification information of the first user in the image forming apparatus.

12. The image forming apparatus as claimed in claim 5, wherein the operation is a cancellation operation to delete all printing data stored in the image forming apparatus.

13. The image forming apparatus of claim 5, wherein the operation can be executed when the hierarchy information of the first user is one of a manager-level authorization.

14. The image forming apparatus of claim 5, wherein the operation can be executed when a verification information of any user is stored in the management unit.

15. The image forming apparatus of claim 5, wherein the operation can be executed when no verification information of any user is stored in the management unit.

16. The image forming apparatus of claim 5, wherein when the hierarchy information of the first user indicates manager-level authorization, the registration unit is configured to allow the first user to select a range of users for which a cancellation operation can be executed.

17. The image forming apparatus of claim 5, wherein the registration unit is configured to allow entry of a service maintenance code to activate in the image forming apparatus a service maintenance mode, in which any operation can be selected and executed.

18. A method for controlling an image forming apparatus:
receiving print data via a communication interface of the image forming apparatus;
generating a printed document based on the print data;
registering a plurality of user information for a plurality of users, each of the plurality of user information including hierarchy information corresponding to one of the plurality of users;
determining if operations of the image forming apparatus requested by the plurality of users are executable based on the corresponding hierarchy information; and
managing a verification process of the image forming apparatus for the plurality of users based on the corresponding hierarchy information.

19. The method of claim 18, wherein the registering includes receiving hierarchy information of a first user of the plurality of users, and storing the hierarchy information of the first user in an address book memory of the image forming apparatus, the method further comprising:
receiving a verification information of identification of the first user;
storing the verification information of the first user in the image forming apparatus;
receiving a request to execute an operation of the image forming apparatus; and
determining if the operation is executable based on the hierarchy information of the first user.

20. The method of claim 19, wherein the determining includes accessing a user authority table stored in the image forming apparatus and comparing the hierarchy information of the first user to the contents of the user authority table.

21. The method of claim 19, further comprising:
deleting the verification information of the first user when the hierarchy information of the first user does not allow for execution of the operation; and
requesting another verification information.

22. The method of claim 21, wherein the requesting of the other verification information includes displaying a login window on an operation panel of the image forming apparatus.

23. The method of claim 19, further comprising:
requesting another verification information when the hierarchy information of the first user does not allow for execution of the operation;
deleting the verification information of the first user when a new verification information is received; and
continuing to store the verification information of the first user when a new verification information is not received.

24. The method of claim 19, further comprising:
requesting another verification information when the hierarchy information of the first user does not allow for execution of the operation;

receiving a verification information of a second user;
retrieving hierarchy information of the second user that is stored in the address book memory; and
determining if the operation can be executed based on the hierarchy information of the second user while continuing to store the verification information of the first user.

25. The method of claim 24, further comprising:
deleting the verification information of the first user when the operation can be executed based on the hierarchy information of the second user.

26. The method of claim 24, further comprising:
executing the operation once when the operation can be executed based on the hierarchy information of the second user; and
deleting the verification information of the second user while continuing to store the verification information of the first user.

27. The method of claim 19, further comprising:
receiving via an operation panel of the image forming apparatus a request to set a range of users for which the operation can be executed; and
storing the requested range of users in the image forming apparatus.

28. The method of claim 19, wherein the receiving of the request to execute the operation includes receiving a request to delete all printing data stored in the image forming apparatus.

29. The method of claim 19, wherein the receiving of the hierarchy information of the first user includes receiving the hierarchy information of the first user from an operation panel of the image forming apparatus.

30. The method of claim 18, further comprising:
receiving a service maintenance code via an operation panel of the image forming apparatus; and
executing any selected operation of the image forming apparatus after the service maintenance code is verified.

31. The method of claim 18, wherein the image forming apparatus is a multi-function printer, the method further comprising:
controlling the image forming apparatus to selectively function as a printer, a copier, a facsimile device, and a scanner.

32. An image forming apparatus comprising:
a communication interface configured to couple to a network;
a printing unit configured to process print data received via the communication interface;
a registration unit configured to register a plurality of user information for a plurality of users, each of the plurality of user information including hierarchy information corresponding to one of the plurality of users; and
means for managing the image forming apparatus, including means for determining if operations of the image forming apparatus requested by the plurality of users are executable based on the corresponding hierarchy information, and means for managing a verification process for the plurality of users based on the corresponding hierarchy information.

33. The image forming apparatus of claim 32, wherein,
the registration unit is configured to allow a first user of the plurality of users to input hierarchy information of the first user, is configured to allow the first user to enter a verification information of the first user, and is configured to allow the first user to request one of the operations of the image forming apparatus, and
the means for determining determines if the operation requested by the first user is executable based on the hierarchy information of the first user after the verification information of the first user is stored in the image forming apparatus.

34. The image forming apparatus of claim 33, wherein when the means for determining determines that the hierarchy information of the first user does not allow for execution of the operation, the means for managing performs the functions of,
requesting another verification information,
deleting the verification information of the first user when a new verification information is received, and
continuing to store the verification information of the first user in the image forming apparatus when a new verification information is not received.

35. The image forming apparatus of claim 33, wherein when the means for determining determines that the hierarchy information of the first user does not allow for execution of the operation, the means for managing performs the functions of,
requesting and receiving a verification information of a second user,
retrieving hierarchy information of the second user that is stored in the image forming apparatus, and
determining if the operation can be executed based on the hierarchy information of the second user while continuing to store the verification information of the first user in the image forming apparatus.

* * * * *